US010796295B2

(12) United States Patent
Subbarayan et al.

(10) Patent No.: US 10,796,295 B2
(45) Date of Patent: Oct. 6, 2020

(54) PROCESSING PAYMENT TRANSACTIONS USING ARTIFICIAL INTELLIGENCE MESSAGING SERVICES

(71) Applicant: Facebook, Inc., Menlo Park, CA (US)

(72) Inventors: Anand Subbarayan, Fremont, CA (US); Yegnashankar Parasuram, Cupertino, CA (US); Shuo Song, Palo Alto, CA (US); Akshay Mittal, Mountain View, CA (US); Xishuo Liu, San Mateo, CA (US)

(73) Assignee: Facebook, Inc., Menlo Park, CA (US)

(*) Notice: Subject to any disclaimer, the term of this patent is extended or adjusted under 35 U.S.C. 154(b) by 180 days.

(21) Appl. No.: 15/389,108

(22) Filed: Dec. 22, 2016

(65) Prior Publication Data

US 2018/0183737 A1 Jun. 28, 2018

(51) Int. Cl.
*G06Q 20/32* (2012.01)
*H04L 12/58* (2006.01)
(Continued)

(52) U.S. Cl.
CPC ......... *G06Q 20/3223* (2013.01); *G06Q 50/01* (2013.01); *H04L 51/02* (2013.01);
(Continued)

(58) Field of Classification Search
CPC . H04L 51/04–046; H04L 29/06; H04L 29/08; H04L 12/58; H04L 67/30–306;
(Continued)

(56) References Cited

U.S. PATENT DOCUMENTS

2008/0089490 A1* 4/2008 Mikkonen ......... G06F 17/30976
379/88.14
2009/0076917 A1* 3/2009 Jablokov ................ G06Q 30/02
705/14.39
(Continued)

OTHER PUBLICATIONS

"Computer program". Encyclopdia Britannica. Encyclopdia Britannica Online. Encyclopdia Britannica Inc., 2015. Web. Oct. 2, 2015 <https://web.archive.org/web/20151002194952/http://www.britannica.com/technology/computer-program> (Year: 2015).*
(Continued)

*Primary Examiner* — Lindsay M Maguire
(74) *Attorney, Agent, or Firm* — Keller Jolley Preece

(57) ABSTRACT

The disclosure relates to systems, methods, and devices for processing payment transactions between a user and a merchant using a messaging bot. In particular, a commerce system allows the user to initiate a communications session with a messaging bot associated with the merchant using natural language. One or more embodiments use natural language processing to analyze messages from the user to the messaging bot, and from the messaging bot to the user, to identify a product and a request to purchase the identified product. Based on the identified product and the request to purchase the product, one or more embodiments initiate a payment transaction on behalf of the user based on a natural language conversation and without redirecting the user away from the communications session. Additionally, one or more implementations provide a payment initiation message from the messaging bot to the user indicating that the payment transaction was initiated.

20 Claims, 13 Drawing Sheets

(51) Int. Cl.
  *H04L 29/08* (2006.01)
  *G06Q 50/00* (2012.01)
  *H04L 29/06* (2006.01)
(52) U.S. Cl.
  CPC .............. *H04L 51/16* (2013.01); *H04L 51/32* (2013.01); *H04L 67/306* (2013.01); *H04L 51/20* (2013.01); *H04L 67/42* (2013.01)
(58) Field of Classification Search
  CPC ..... H04L 65/1069; H04L 51/32; H04L 51/16; H04L 51/02; H04L 51/20; H04L 67/42; H04L 69/24; G06Q 50/00–01; G06Q 20/32; G06Q 20/10; G06Q 20/108; G06Q 20/322; G06Q 20/30; G06Q 20/206; G06Q 20/12–425; G06Q 20/3223; G06Q 67/306; G07F 11/002; G07F 19/00
  See application file for complete search history.

(56) References Cited

U.S. PATENT DOCUMENTS

| | | | | |
|---|---|---|---|---|
| 2012/0215871 | A1* | 8/2012 | Zhang | G06Q 30/0269 709/206 |
| 2016/0117670 | A1* | 4/2016 | Davis | G06Q 20/40 705/39 |
| 2016/0285816 | A1* | 9/2016 | Schmid | G06Q 30/0631 |
| 2016/0294739 | A1* | 10/2016 | Stoehr | H04L 51/04 |

OTHER PUBLICATIONS

"Web Page". Wikipedia, Sep. 29, 2015 <https://en.wikipedia.org/w/index.php?title=Web_page &oldid=683254341> (Year: 2015).*

* cited by examiner

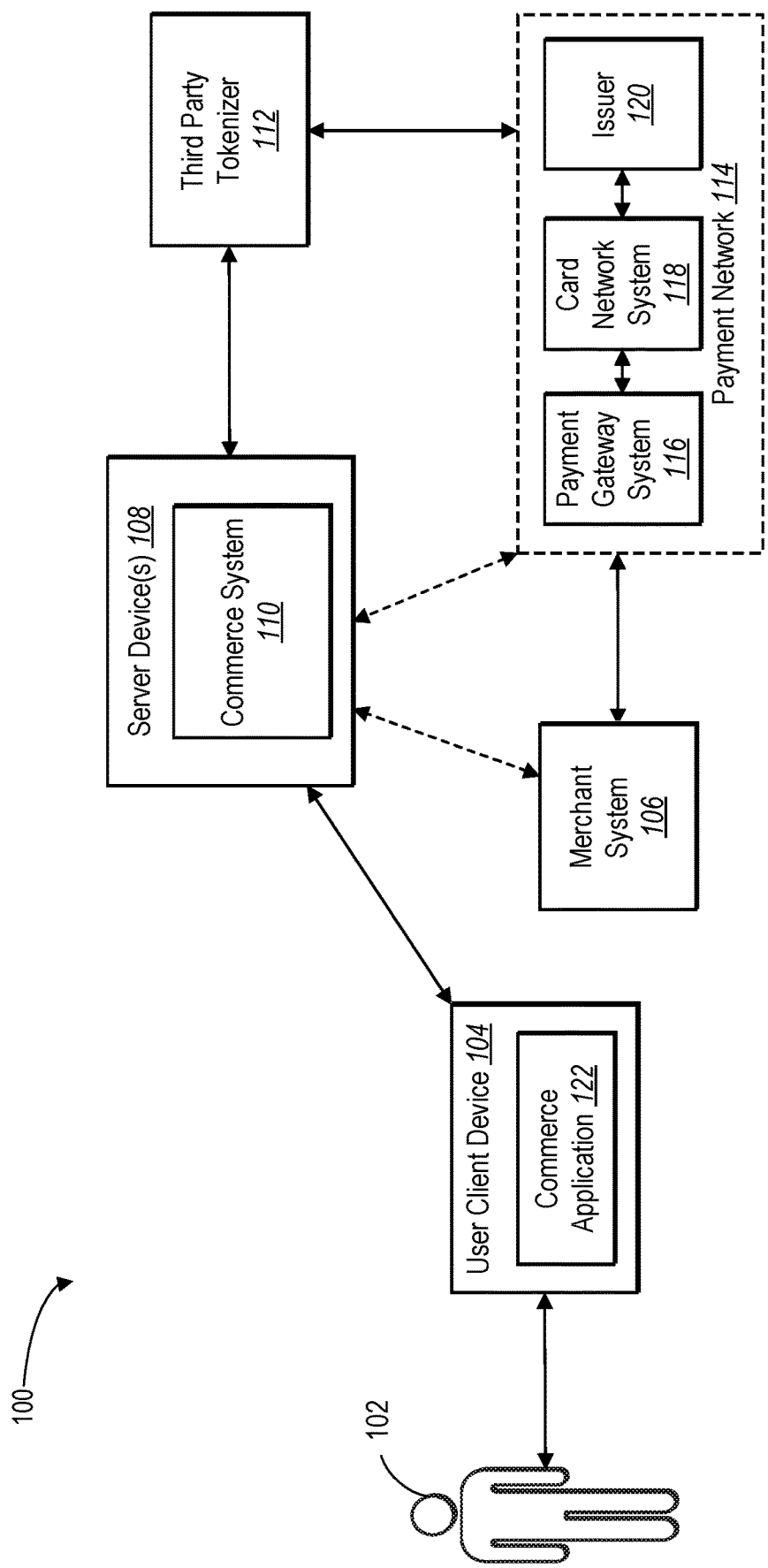

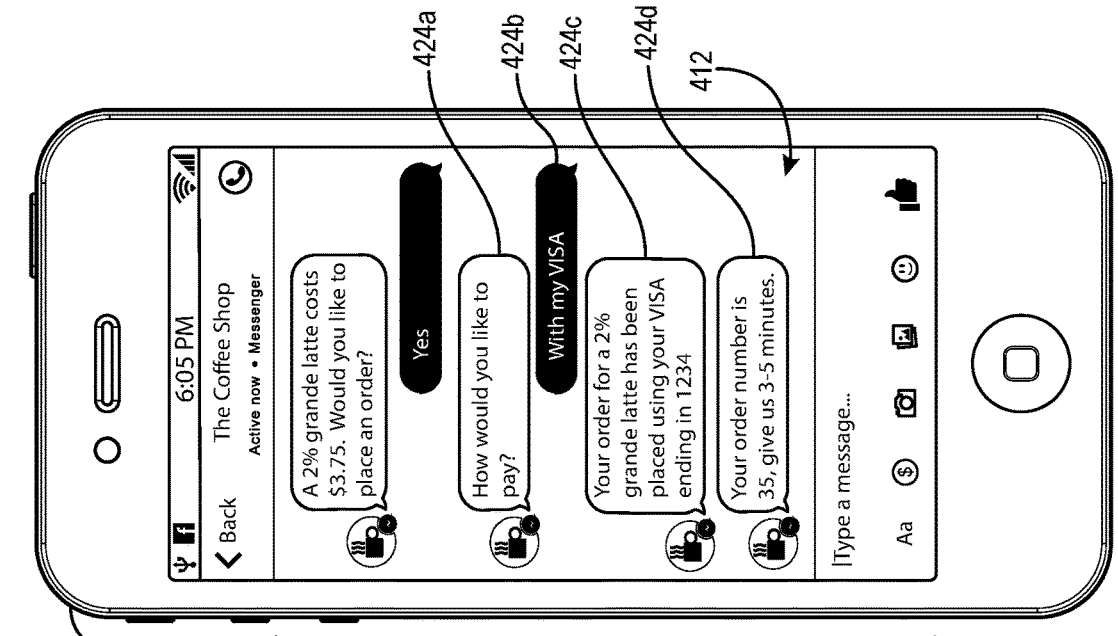
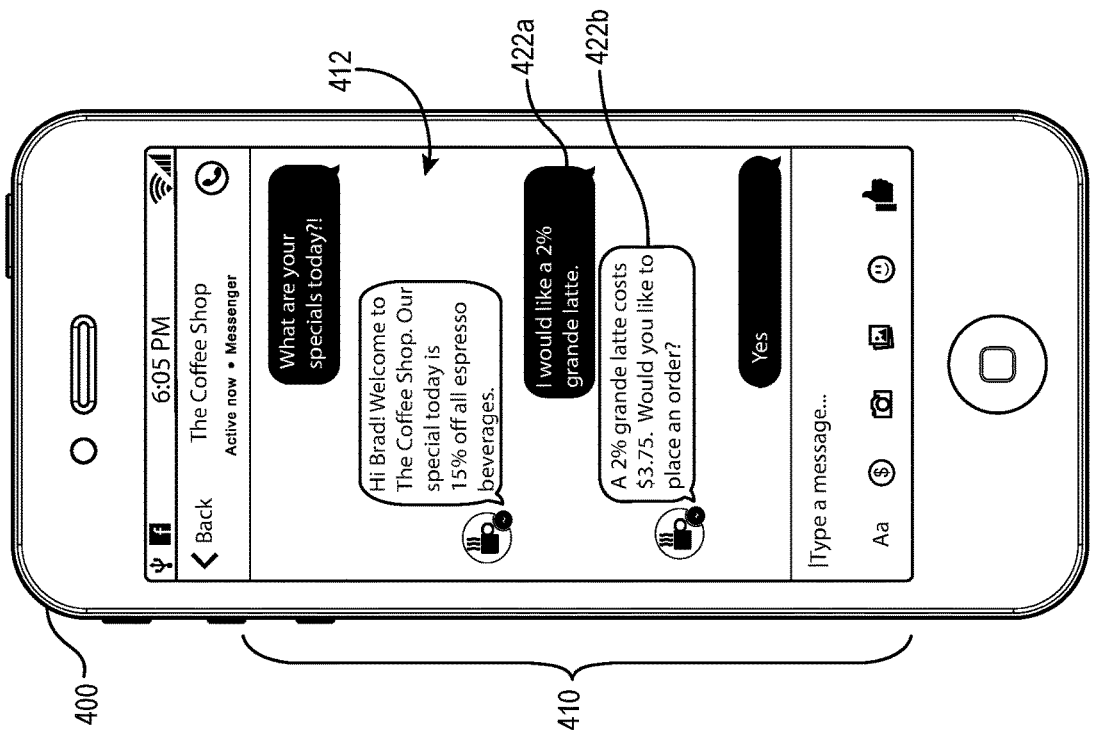
Fig. 4D
Fig. 4C

PROCESSING PAYMENT TRANSACTIONS USING ARTIFICIAL INTELLIGENCE MESSAGING SERVICES

BACKGROUND

Background and Relevant Art

Electronic payment systems allow users to perform payment transactions with others via software applications on one or more types of devices (e.g., desktop devices and mobile devices). Some electronic payment systems allow users to perform payment transactions with financial institutions or merchants (i.e., peer-to-business payment transactions). For example, some electronic payment systems allow users to enter into payment transactions for goods or services with a merchant by way of an electronic payment application on a computing device.

Payment transactions between users and merchants typically require users to pay via one or more approved methods of payment (e.g., cash, check, credit card, debit card, gift card). Often times, especially in the case of small businesses, merchants may only accept a few methods of payment to avoid contracting costs or transaction costs associated with one or more payment methods. Thus, a user desiring to purchase products or services from different merchants, each of which may accept different methods of payment, may be required to carry several methods of payment.

Many conventional electronic payment systems have several drawbacks that often cause users frustration, confusion, and result in an unsatisfactory payment process. One such drawback of conventional electronic payment systems is that they are typically standalone systems with limited functionality, which a merchant must implement and to which a user must subscribe. Specifically, some conventional electronic payment systems include proprietary software from the merchant that is limited to allowing users to interact with only a specific merchant (e.g., a merchant-specific mobile application or a merchant-specific website). Other conventional electronic payment systems that allow users to perform payment transactions with different merchants often limit users just to performing payment transactions.

The limited nature of conventional electronic payment systems also adds inconvenience. In particular, the standalone nature of conventional electronic payment systems typically requires that users open a separate application dedicated just to payment transactions in order to send or receive a payment. The inconvenience of the standalone nature of conventional electronic payment systems can discourage users from using such systems. Furthermore, the rigidity of conventional electronic payment systems when implemented with merchant-specific software can also limit the ability of users to communicate with the merchants and find a product to fill a specific need.

Accordingly, there are a number of disadvantages with conventional electronic payment systems and methods.

SUMMARY

One or more embodiments described herein provide benefits and/or solve one or more of the foregoing or other problems in the art with systems and methods to provide payment transactions using messaging bots. In particular, the systems and methods allow users to engage in electronic payments with merchants by interacting with artificial intelligence messaging services. One or more embodiments initiate communications sessions (e.g., messaging threads) between users and messaging bots associated with merchants. The systems and methods allow the users to converse with the messaging bots using natural language to identify and select products available from the merchants. Additionally, the systems and methods allow the users to initiate payment transactions to purchase selected products from within the communications sessions with the messaging bots.

The systems and methods analyze messages during communications sessions to identify requests by users to purchase products. Specifically, one or more embodiments use natural language processing to analyze one or more messages by the users to the messaging bots to identify a product based on context of a conversation session, including descriptions of the product. Furthermore, the systems and methods identify a request by a user to purchase the identified product using natural language processing. After identifying the product and the request to purchase the product, the systems and methods initiate the payment transaction between the user and the corresponding merchant to purchase the product for the user. By using natural language processing to analyze messages between users and messaging bots associated with merchants, the systems and methods allow the users to purchase products from within the communications session.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIG. 1 illustrates a schematic diagram of an example system that facilitates electronic payments in accordance with one or more embodiments;

FIGS. 4A-4D illustrate user interfaces for initiating a payment transaction as described in reference to FIGS. 2A-2B in accordance with one or more embodiments;

DETAILED DESCRIPTION

Figure 2A:
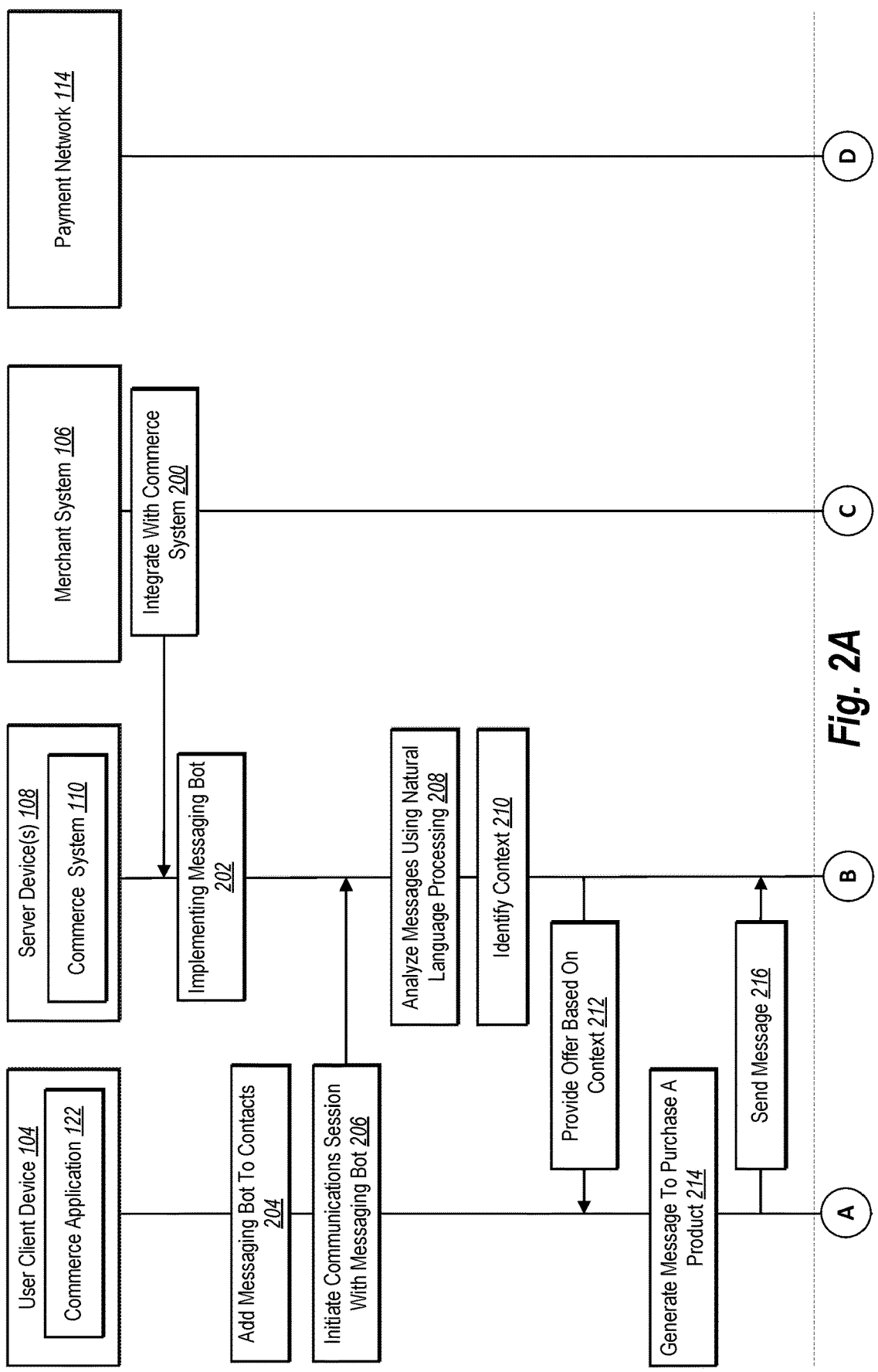
FIGS. 2A-2B illustrate sequence-flow diagrams illustrating various methods of processing payment transactions using messaging bots in accordance with one or more embodiments.

Embodiments of the present disclosure provide a commerce system that processes payment transactions via messaging bot interactions. In particular, one or more embodiments provide a commerce system that allows users to engage in conversation with messaging bots associated with merchants. The commerce system allows users to use natural language to identify products available from merchants and select products to purchase while conversing with the messaging bots. For example, the commerce system uses natural language processing to analyze one or more messages entered by a user in a communications session (e.g., a conversation in a messaging thread) with a messaging bot to identify a request to purchase a product from a corresponding merchant. In response to identifying the request, the commerce system initiates a payment transaction between the user and the merchant for the product.

As mentioned, the commerce system allows users to engage in communications sessions with messaging bots associated with merchants. Specifically, the commerce system initiates a communications session, such as a messaging thread, between a user and a messaging bot. A merchant can implement a messaging bot with the commerce system to interact with potential customers via a messaging system, such as a social-networking system. Thus, the user can interact with a messaging bot associated with a merchant via the corresponding messaging system, rather than waiting for a customer service representative or manually browsing a site/application associated with the merchant.

While a user converses with a messaging bot by sending one or more messages to the messaging bot during the communications session, the commerce system analyzes the message(s) to determine a context of the conversation. For instance, the commerce system can analyze messages using natural language processing to identify a product mentioned or referred to in the messages. The commerce system can identify the product based on a description of the product and information stored by the merchant for the product. Analyzing messages using natural language processing allows users flexibility in describing products and/or obtaining information about products offered by the merchant.

In one or more embodiments, the commerce system provides suggestions of products based on an identified context of the communications session. Specifically, the commerce system can use a context identified from one or more messages to determine that the user may be interested in a specific product. The commerce system can then recommend the product to the user as a message from the messaging bot within the conversation flow of the communications session. Providing suggestions to the user can aid the user in identifying a desired product or an alternate product provided by the merchant.

Furthermore, the commerce system can analyze the messages to identify a request by the user to initiate a payment transaction between the user and the merchant for a product. In particular, the commerce system uses natural language processing to identify a request to purchase a product within messages in a flow of the conversation without requiring the user to follow a rigid set of steps to purchase the product. Additionally, the commerce system can also identify one or more configurations, preferences, or details associated with the request to purchase the product so that the merchant can fulfill the request according to the user's desires.

As mentioned, the commerce system described herein provides advantages over conventional electronic payment systems. Specifically, facilitating the identification and purchase of products within a communications session between a user and a messaging bot provides a flexible way for users to purchase products. By facilitating purchases by a user using natural language in a communications session with a messaging bot, the commerce system can allow users to make purchases without having to open a separate payments application, and thus, requires less computing resources.

Additionally, allowing users to electronic payment transactions using messaging bots integrated with the commerce system reduces the number of different software applications that a user must use to communicate and enter into payment transactions with the corresponding merchants. In particular, the commerce system allows users to interact with and purchase products from multiple different products from within a single software application. The commerce system also provides users with increased flexibility in obtaining information about products and entering into payment transactions with merchants beyond the use of rigid, merchant-specific applications.

FIG. 1 is a schematic diagram illustrating an environment that includes a commerce system in accordance with one or more embodiments. An overview of the environment is described in relation to FIG. 1. Thereafter, a more detailed description of the components and processes of the commerce system and other components within the environment are provided in relation to the remaining figures.

As illustrated by FIG. 1, a system 100 can include a user 102, a user client device 104, a merchant system 106, server device(s) 108 hosting a commerce system 110, and a payment network 114. The system 100 can allow a user 102 to interact with a messaging bot associated with a merchant system 106 to make a purchase. Specifically, the user 102 uses the user client device 104 to enter into payment transactions with a merchant associated with the merchant system 106 by communicating with the messaging bot in a communications session via the commerce system 110. As further illustrated in FIG. 1, the user client device 104 can communicate with the server device(s) 108 hosting the commerce system 110 that enables communications between the user 102 and the messaging bot.

The commerce system 110 can interact with the payment network 114, the merchant system 106, and the client device 104 to provide payment transactions between users and merchants using messaging bots with natural language processing. In one or more embodiments, the commerce system 100 allows the user 102 to enter into a communications session with a messaging bot associated with the merchant system 106. For instance, the commerce system 110 allows the user 102 to initiate a payment transaction with the merchant by sending one or more messages to the messaging bot. As will be explained in more detail below, the server device(s) 108 or the merchant system 106 can communicate with various components of the payment network 114 to coordinate a transaction that facilitates the payment between the user 102 and the merchant (i.e., between their respective financial/payment accounts).

As used herein, the term "messaging bot" refers to an artificial intelligence messaging service for communicating with users within a communications session (e.g., a messaging thread). For example, a messaging bot can include an application, script, or program capable of generating messages using natural language. Additionally, a messaging bot can interpret messages entered by users using natural language processing to understand each individual message, as well as a context of the communications session as a whole. The merchant system 106 can implement the messaging bot with the commerce system 110 such that the commerce system 110 hosts the messaging bot (i.e., users access the messaging bot at the commerce system 110). The commerce system 110 also communicates with the merchant system 106 to send and receive information associated with products and/or product purchases in connection with the messaging bot.

Figure 8:
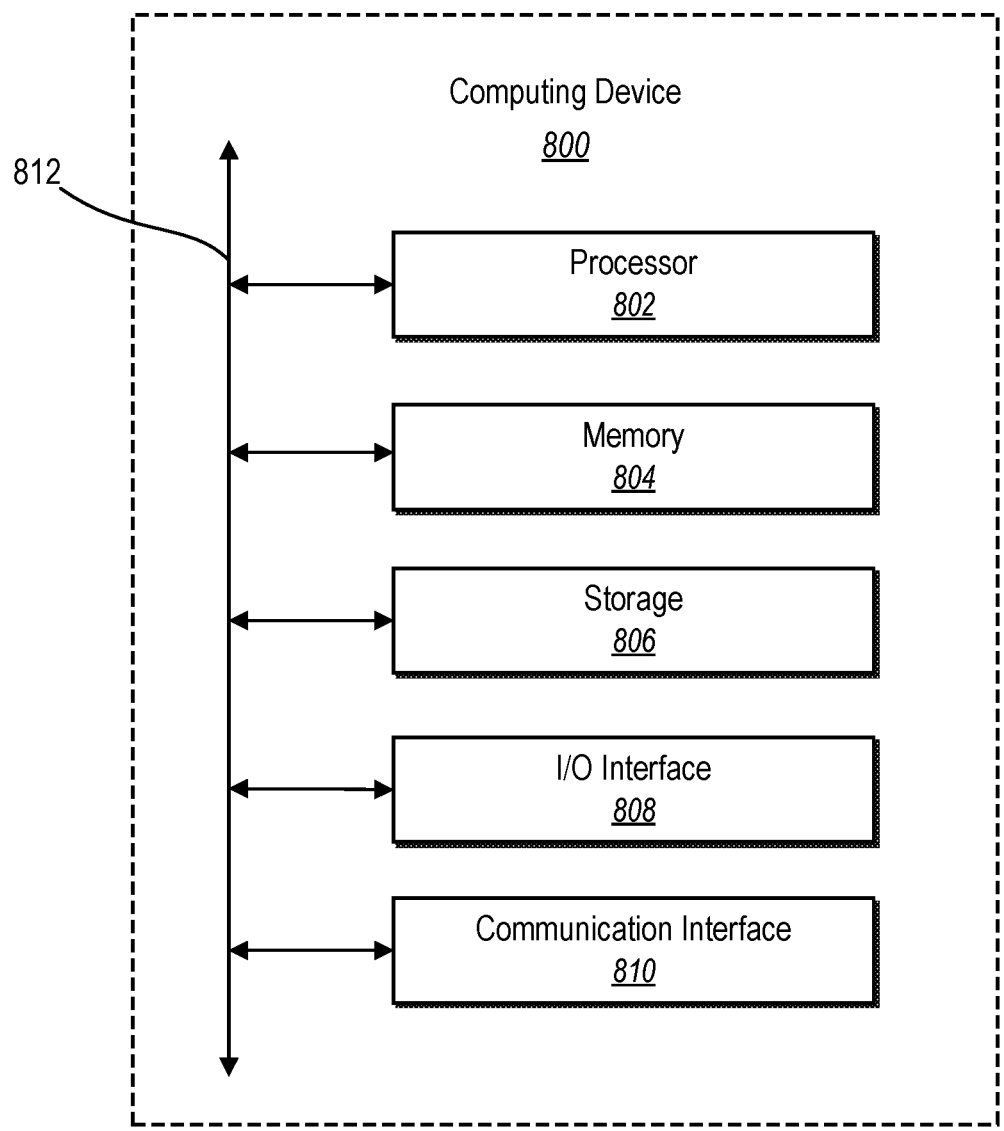
FIG. 8 illustrates a block diagram of an example computing device in accordance with one or more embodiments.

As mentioned previously, and as FIG. 1 illustrates, the user 102 can interact with the user client device 104. Examples of client devices include computing devices such as mobile devices (e.g., smartphones, tables), laptops, desktops, or any other type of computing device. FIG. 8 and the corresponding description provide additional information regarding computing devices. Moreover, and as mentioned above, the user client device 104 can communicate with the messaging bot associated with the merchant system 106 through a network. In one or more embodiments, the network includes the Internet or World Wide Web. The network, however, can include one or more private and/or public networks that use various communication technologies and protocols, as further described below with reference to FIG. 9.

The commerce system 100 coordinates the sending and receiving of payments between the user 102 and a merchant associated with the messaging bot. For example, the user 102 can provide input via a commerce application 122 of the user client device 104 to send messages to and receive messages from the messaging bot at the commerce system 110 to obtain information associated with goods or services available from the corresponding merchant. Additionally, the user 102 can use the commerce application 122 to send one or more messages to the messaging bot including a request to purchase a specific product from the merchant. The commerce application 122 allows the user to enter payment information (e.g., the user's credit card or other payment credential, payment amount, payment currency, payment description) in messages to the messaging bot to initiate the payment transaction. Similarly, the commerce system 110 can allow the messaging bot to send information to and request information from the user 102 via the commerce application 122.

As used herein, the term "commerce application" refers to an application that allows a sender user to send/receive messages in a communication session and to transfer funds to a recipient via one or more payment methods. For example, a commerce application can allow a sender user to initiate a payment transaction with a merchant to purchase goods or services offered by the merchant by conversing with a messaging bot using natural language during a communications session. Thus, the commerce application can include messaging capabilities to allow a sender user to communicate with a messaging bot and payment capabilities to allow the sender user to engage in payment transactions with the corresponding merchant.

In one or more embodiments, the commerce system 100 coordinates a payment transaction between one or more accounts of the user 102 and one or more accounts of the merchant via the payment network 114. For example, in response to receiving one or more messages from the user 102 indicating a request to engage in a payment transaction, the commerce system 110 can communicate with the payment network 114 to obtain and provide payment information to process a payment using one or more components within the payment network 114, as described in more detail below. Alternatively, or additionally, the commerce system 110 can maintain one or more user accounts directly, and therefore, the commerce system 110 can coordinate a transaction, or a portion of a transaction.

As illustrated in FIG. 1, the payment network 114 includes a payment gateway system 116, a card network system 118, and an issuer of a payment authorization number (e.g., issuer 120). In other embodiments, the payment network 114 includes more or fewer actors. Additionally, although FIG. 1 illustrates a particular arrangement of the user 102, the second user 102b, the user client device 104, the merchant system 106, the commerce system 110, and the payment network 114, various additional arrangements are possible. Furthermore, the payment network 114 can include a plurality of payment gateway systems, card network systems, and card issuers, which may correspond to different merchant systems or users, though FIG. 1 illustrates only a single payment gateway system 116, card network system 118, and issuer 120 for simplicity in description.

As used herein, the terms "card issuer" and "issuer" refer to a financial institution (e.g., a bank) that issues credit cards or debit cards to consumers and services their accounts. Issuers can also be, or can communicate with, a card network system or a payment gateway system. Some examples of card issuers include CHASE, BANK OF AMERICA, WELLS FARGO, U.S. BANK, and CITIBANK. Examples of card network systems include VISA, DISCOVER, and MASTERCARD.

As used herein, the term "payment authorization number" refers to a number that authorizes access to the corresponding payment account. For example, a payment authorization number can be a credit card number or debit card number.

As used herein, the term "payment gateway system" refers to software and servers that transmit transaction information to acquiring banks and responses from issuing banks (such as whether a transaction is approved or declined). Thus, a payment gateway system facilitates communication between banks. Furthermore, payment gateway implement Payment card Industry Data Security Standard (PCI-DSS or PCI). Payment gateway systems help bridge communication protocols and provide security on behalf of a merchant. Payment gateway systems usually charge a per transaction fee. Some example of payment gateway systems include Braintree, Dwolla, Paypal, Authorize.net.

Additionally, or alternatively, the payment network can include more or fewer components as may serve a particular embodiment. Specifically, various embodiments of the payment network 114 also include one or more components for processing payment transactions between users and merchants. For instance, the payment network 114 can include components for communicating with the client device 104, the merchant system 106, and the server device(s) 108, as well as payment processing components such as bank systems associated with the users and merchants and components for communicating with the bank systems.

In one or more embodiments, the merchant system 106 can integrate with the commerce system 110 to allow the commerce system 110 to communicate directly with the merchant system 106 in connection with communication sessions and/or payment transactions. For example, the merchant system 106 can integrate with the commerce system 110 by registering a merchant account or establishing a formal/contractual relationship with the commerce system 110, establishing a merchant page with the commerce system 110, or encoding API calls in a merchant site that causes the merchant system 106 and commerce system 110 to pass information. In particular, the merchant system 106 can implement a messaging bot at the commerce system 110 to establish communication sessions with users and engage in payment transactions associated with the communication sessions. The commerce system 110 can obtain information from the merchant system 106 during the communications sessions to provide information to the users and facilitate payment transactions between the users and merchant.

Additionally, the commerce system 110 performs one or more operations associated with analyzing messages entered by users to the messaging bot to obtain product and/or purchase information associated with the user 102 and the merchant system 106. For instance, the commerce system 110 analyzes messages from the user 102 to a messaging bot using natural language processing. The commerce system 110 can use information identified during a communications session between the user 102 and the messaging bot to facilitate a payment transaction for purchasing a product or for further communications between the user 102 and the messaging bot.

Although FIG. 1 illustrates that the system 100 includes only a single merchant system 106 in communication with the commerce system 110, the commerce system 110 can be in communication with any number of merchant systems 106. For example, a plurality of merchant systems 106 can implement messaging bots with the commerce system 110 with which the user 102 or other users can communicate. Thus, the commerce system 110 can facilitate communications and payment transactions with a plurality of merchant systems via a plurality of corresponding messaging bots. As described in more detail below, the commerce system 110 can maintain relationship information associated with the users and messaging bots, such that users can establish relationships with one or more messaging bots (e.g., by adding the messaging bots to their contacts).

As described above, the commerce system 110 provides payment transactions using artificial intelligence messaging services. For example, the commerce system 110 provides the ability for users to communicate with messaging bots to purchase products from merchants using natural language. As follows, FIGS. 2A-2B and 3A-3B illustrate a process diagrams for processing payment transactions based on communications sessions between a user and a messaging bot. Consistent with commerce system illustrated in FIG. 1, FIGS. 2A-2B and FIGS. 3A-3B illustrate (according to a sequence flow of operations) a user client device 104, a merchant system 106, server device(s) 108, and a payment network 114.

Figure 2B:
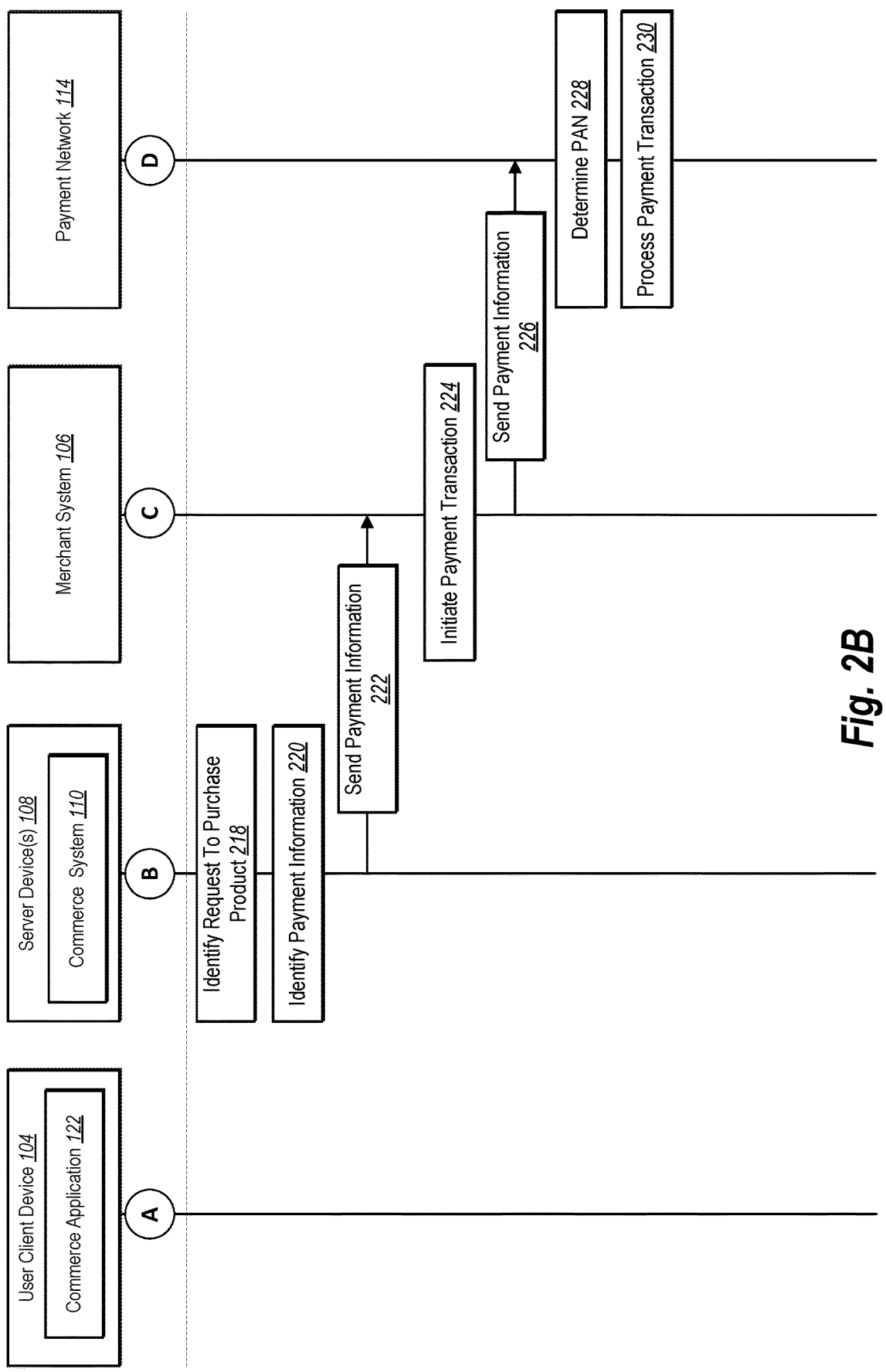

As mentioned, FIGS. 2A-2B illustrate a process diagram of processing payment transactions via a messaging bot. Specifically, the process illustrated in FIG. 2A includes processing a payment transaction in connection with an initial communications session between a user and a messaging bot. In one or more embodiments, a process for processing a payment transaction between a user and a merchant associated with a messaging bot begins with the merchant system 106 integrating 200 with the commerce system 110 at the server device(s) 108. For example, the merchant system 106 can integrate with the commerce system 110 by registering a merchant account with the commerce system 110. The merchant account can allow the merchant system 106 to engage in communications and payment transactions via the commerce system 110.

In one or more embodiments, integrating with the commerce system 110 allows the merchant system 106 to implement a messaging bot 202 at the commerce system 110. According to one or more implementations, the messaging bot is an artificial intelligence messaging service that acts on behalf of the merchant system 106 to communicate with users of the commerce system 110. For instance, the messaging bot can communicate with users of the commerce system 110 by sending and receiving messages in communications sessions with the users. In one or more implementations, the commerce system 110 is associated with, or includes, a social-networking system that allows users of the social-networking system to communicate with the messaging bot and/or add the messaging bot to the users' contacts via the social-networking system.

The merchant system 106 can leverage an application program interface (API) associated with the commerce system 110 to generate the messaging bot. For example, the API can allow the merchant system 106 to implement the messaging bot to include various features and/or behaviors based on preferences or capabilities of the merchant system 106. To illustrate, the merchant system 106 can configure the messaging bot to behave based on the specific goods or services that the merchant system 106 provides. Additionally, the merchant system 106 can configure the messaging bot to behave according to a specific conversation style (e.g., formal, informal), in a specific language, or according to any other preference or attribute of the merchant system 106.

In one or more embodiments, the messaging bot includes an identity associated with the merchant system 106 such that users interacting with the messaging bot understand that they are interacting with a representative of the merchant system 106. In one or more embodiments, the identity of the messaging bot can also indicate that the messaging bot is a virtual messaging service. Additionally, the commerce system 110 can make the API available to a plurality of merchant systems that integrate with the commerce system 110. Thus, users of the commerce system 110 can potentially interact with a plurality of different messaging bots associated with a plurality of different merchants.

After the merchant system 106 has implemented the messaging bot, a user of the user client device 104 can add the messaging bot to the user's contacts 204 to allow the user to communicate with the messaging bot. For example, the user can add the messaging bot for a merchant to the user's contacts to allow the user to converse with the messaging bot via the commerce system 110. To illustrate, the user can identify the messaging bot based on a merchant page or merchant-specific portion of the commerce application 122 on the user client device 104. The user can then select an option to add a messaging bot associated with the merchant to the user's contacts. Alternatively, the user may not be required to add the messaging bot to the user's contacts in order to communicate with the messaging bot.

In one or more embodiments, the user then initiates a communications session with the messaging bot 206 using the commerce application 122. Specifically, the user can initiate a communications session (e.g., an instant messaging session) with the messaging bot by selecting an option within the commerce application 122 to begin sending messages to the messaging bot. For example, the user can open a contacts list within the commerce application 122 and select a contact of the messaging bot. The user can then select an option to initiate the communications session with the messaging bot and begin sending messages to and receiving messages from the messaging bot. Alternatively, the user can navigate to a merchant-specific portion of the commerce application 122 and select an option to initiate the communications session from the merchant-specific portion.

Initiating the communications session can cause the commerce application 122 to initiate a messaging thread on the user client device 104 involving the user and the messaging bot. For example, the user client device 104 can display a messaging interface with the messaging thread involving the user and the messaging bot. The user can then use the commerce application 122 to enter messages to send to the messaging bot and to receive messages from the messaging bot. For instance, the user can enter messages asking the messaging bot to provide information about a product or to suggest a product based on a description of the user's needs.

Once the user has begun conversing with the messaging bot within the communications session, the commerce system 110 can begin analyzing messages using natural language processing 208. In particular, the commerce system 110 can analyze messages from the user to the messaging bot using natural language processing to determine the content of the messages. The commerce system 110 can use the natural language processing to identify a structure, phrases, words, or other content or characteristics of the messages entered by the user. Additionally, the commerce system 110 can use the identified content of the messages for generating replies by the messaging bot to the user, including replies intended to direct a flow of the conversation while obtaining information associated with a potential payment transaction for a product.

In one or more embodiments, the commerce system 110 identifies a context 210 of the communications session between the user and the messaging bot. Specifically, the commerce system 110 identifies the context based on all of the messages entered by the user to the messaging bot. For example, the commerce system 110 can use the content of the messages entered by the user to determine a purpose of the communications session. To illustrate, the commerce system 110 can determine that the user is attempting to obtain information about a specific product or about a specific need of the user. In another example, the commerce system 110 can determine that the user is requesting information about a plurality of related products (e.g., a product type or genre).

The commerce system 110 can also use one or more messages from the messaging bot to the user to identify the context. For instance, the commerce system 110 can analyze the messages from the messaging bot to identify context 210 in one or more replies by the user. To illustrate, if the messaging bot asks a question to which the user responds, the commerce system 110 can use the message from the messaging bot to determine the context of the response by the user. Additionally, messages from the messaging bot can indicate additional details or description about a product available from the merchant, which can be useful as context to identifying the purpose of the communications session.

In one or more embodiments, after identifying a context of the communications session, the commerce system 110 provides an offer based on the context 212. Specifically, the commerce system 110 can identify/infer one or more interests of the user based on the context of the communications session. The commerce system 110 can then identify one or more products that the user may be interested in based on the identified interest(s). The commerce system 110 sends an offer to the user during the communications session.

The offer can include a message by the messaging bot offering a specific product to the user. For instance, if the commerce system 110 determines that the user may be interested in a certain product, the commerce system 110 can provide an offer for the product to the user. The offer message can include information that allows the user to find the product on a merchant page or merchant-specific portion of the commerce application 122. The offer can also include an image and/or a link (e.g., a hyperlink) to a description of the product to allow the user to view more detail about the product.

In one or more implementations, the offer includes an advertisement for the product(s). For example, the offer can include a suggestion by the messaging bot for the user to purchase a product. To illustrate, the offer can include a recommendation to purchase a specific product that the commerce system 110 has identified. Alternatively, the offer can include a suggestion by the messaging bot to view information about a specific product. For example, the offer can include a recommendation to view a product page for the product that is linked in the message.

In one or more embodiments, the commerce system 110 identifies a plurality of products or a genre/type of products to provide as an offer to the user. In particular, the commerce system 110 can determine that the user may be interested in the genre/type of products based on the user mentioning one or more related products or one or more preferences/needs of the user within the communications session. The commerce system 110 can then generate a message including an offer for the user to view or purchase products of the identified genre/type.

After the user views the offer within the commerce application 122 at the user client device 104, the user client device 104 can generate a message to purchase a product 214. Specifically, the user can create a message that indicates that the user would like to purchase a specific product. For example, the user can respond affirmatively to the offer from the messaging bot to purchase a product. Alternatively, the user can generate a message that requests to purchase a different product than a product listed in the offer from the messaging bot. After generating a message to purchase a product, the user client device 104 sends the message 216 to the commerce system 110 in connection with the communications session between the user and the messaging bot.

In one or more embodiments, prior to or after requesting to purchase a product, the user and messaging bot can exchange one or more additional messages related to one or more products. For example, the user can send one or more messages requesting information about a plurality of different products. To illustrate, the commerce system 110 can analyze the messages using natural language processing to interpret the requests. The commerce system 110 can then communicate with the merchant system 106 to access a product catalog or database with information associated with the corresponding products. The commerce system 110 can then provide information about the corresponding products in one or more response messages from the messaging bot to the user.

Similarly, the user can send one or more messages to the messaging bot asking for recommendations of products based on interests or preferences of the user. The commerce system 110 can analyze the messages using natural language processing to interpret the request for recommendations. The commerce system 110 accesses a user account or user preferences associated with the user to identify one or more interests or preferences of the user. The commerce system 110 can then determine one or more products to recommend to the user and generate one or more messages for sending to the user from the messaging bot within the communications session.

In any case, after the commerce system 110 receives the messages requesting to purchase a product from the user client device 104, the commerce system 110 can then identify the request to purchase the product 218. In particular, the commerce system 110 uses natural language processing to analyze the message from the user client device 104 to determine that the user has requested to purchase the product. For example, the commerce system 110 can identify one or more words or phrases indicating a request to purchase a product. Additionally, the commerce system 110 can identify one or more words or phrases in context (e.g., within the user's messages or the messaging bot's messages) naming or describing the product.

After identifying the product and the request to purchase the product, the commerce system 110 can identify payment information 220 for the user to purchase the product. For instance, the commerce system 110 can identify a payment credential (e.g., a credit card, debit card, account number) of the user for processing a payment transaction between the user and a merchant associated with the merchant system 106. To illustrate, the commerce system 110 can access a user account for the user to obtain a payment token, representing the payment credential, stored with the user account. Alternatively, the commerce system 110 can identify the payment credential by providing an interface in the commerce application 122 that allows the user to input a payment authorization number for the payment credential and then obtaining the corresponding payment token from the payment network 114.

In one or more embodiments, the commerce system 110 identifies information about the product for processing the payment transaction. Specifically, the commerce system 110 can identify a payment amount by identifying a price of the item. For example, the commerce system 110 can communicate with the merchant system 106 to obtain the price of the item and assign the price of the item as the payment amount for the payment transaction. The commerce system 110 can also obtain other information about the product from the merchant system 106, such as a product identifier for providing to the user via the messaging bot in connection with the payment transaction.

Once the commerce system 110 has identified the payment information, the commerce system 110 can send the payment information 222 to the merchant system 106. Specifically, the commerce system 110 can communicate the payment information to the merchant system 106 by sending the payment information using a secure data transfer, such as may be required by Payment Card Industry (PCI) standards. For example, the commerce system 110 can encrypt some or all of the payment information (e.g., the payment token) and send the encrypted payment information to the merchant system 106 for the merchant system 106 to use in processing the payment transaction. Although FIG. 2B illustrates a payment transaction process via the merchant system 106, alternative examples include the commerce system 110 processing the payment transaction directly with the payment network 114.

Upon receiving the payment information from the commerce system 110, the merchant system 106 initiates the payment transaction 224 with the user. In particular, the merchant system 106 identifies the payment token from the received payment information and also identifies the payment amount, purchase information, and other information (e.g., user information) for processing the payment transaction. For instance, the merchant system 106 can decrypt any encrypted data to identify the corresponding payment information (e.g., the payment token). Alternatively, the merchant system 106 may pass encrypted data to the payment network 114.

The merchant system 106 then sends the payment information 226 (e.g., the payment token and any other payment information) to the payment network 114. The payment network 114 can use the received payment information to determine a payment authorization number 228 associated with the payment transaction. For example, the payment network 114 can determine the payment authorization number from a payment token by identifying the payment authorization number from a mapping of payment authorization numbers to payment tokens. The payment network 114 can then process the payment transaction 230 between the user and the merchant associated with the merchant system 106 by transferring funds from the payment credential of the user to a payment credential of the merchant.

Figure 3A:
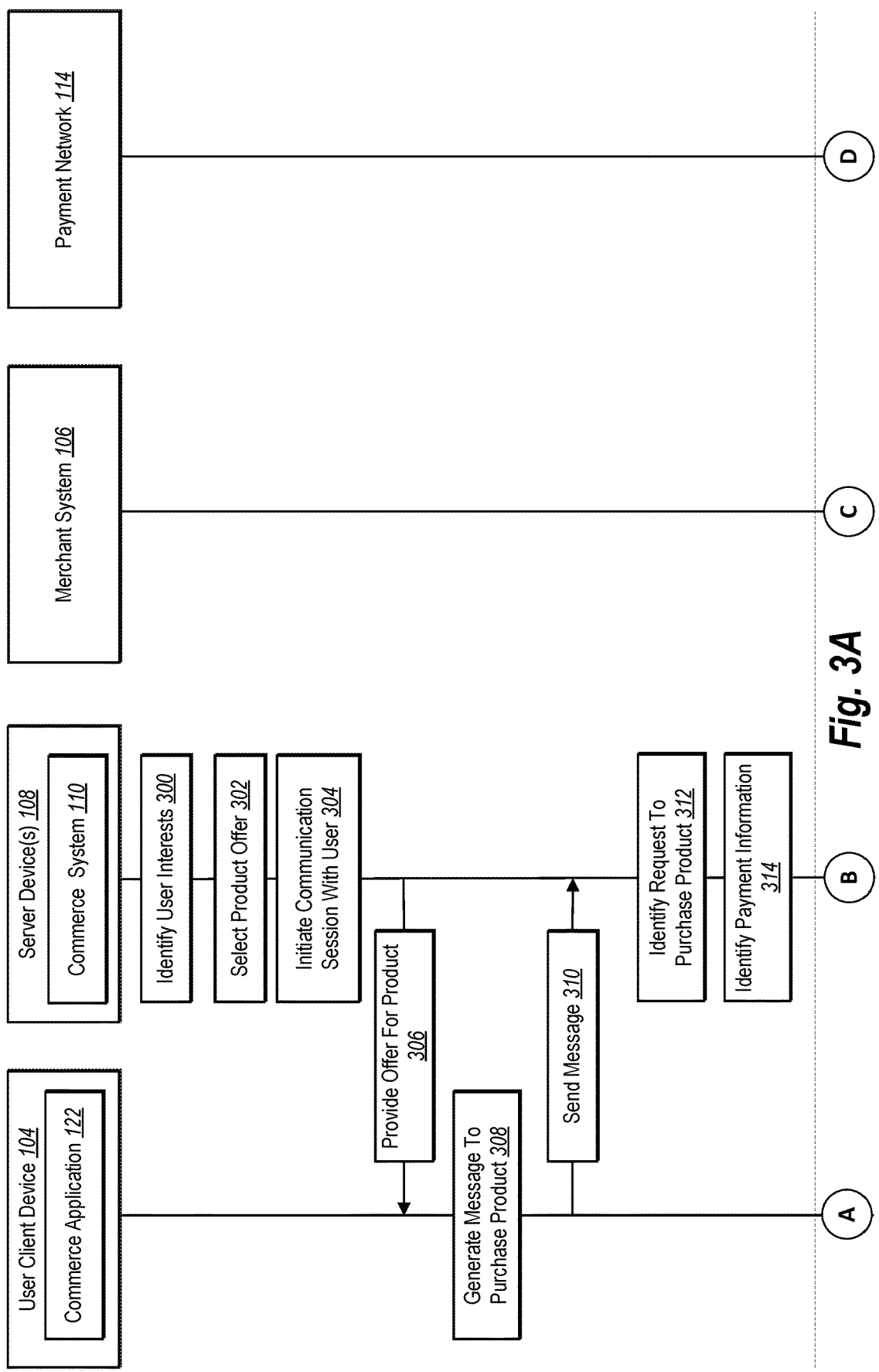
FIGS. 3A-3B illustrate sequence-flow diagrams illustrating various methods of processing payment transactions using messaging bots in accordance with one or more embodiments.
Figure 3B:
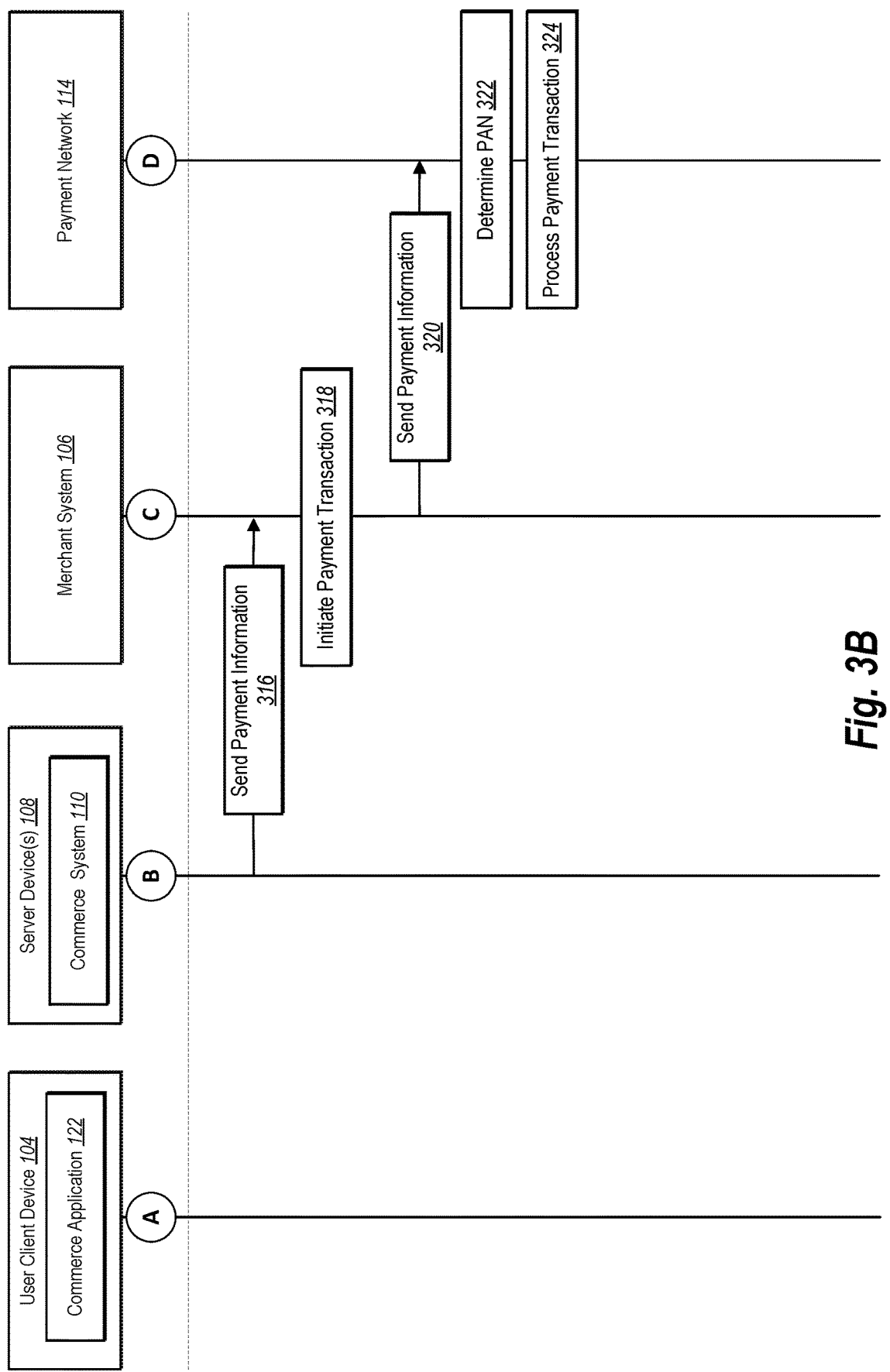

FIGS. 3A-3B illustrate a payment transaction process after the user has already initiated one or more previous communications sessions with the messaging bot associated with the merchant system 106. In one or more embodiments, a process for processing a payment transaction using a messaging bot begins with the commerce system 110 identifying user interests 300 associated with the user. For example, the commerce system 110 can identify one or more user interests for determining whether the user may be interested in a product. By identifying one or more interests of the user, the commerce system 110 can more easily identify the user's needs when recommending a product and provide more accurate suggestions.

In one or more embodiments, the commerce system 110 accesses a user account associated with the user to identify the one or more user interests. In particular, the commerce system 110 can maintain a user account that includes interests based on the messages from the user to the messaging bot associated with the merchant system 106. For instance, the user interests can include characteristics of certain products that indicate a preference of the user over other characteristics of the same or similar products. To illustrate, if the user has indicated, during a communications session with the messaging bot, a desire to purchase a product based on a specific characteristic of the product and/or expressed a dislike for another characteristic of one or more products, the commerce system 110 can store such information with the user account.

The commerce system 110 can also use other information related to the user to determine a product that may interest the user. For example, the commerce system 110 can use characteristics of the user, habits of the user, and/or relationships between the user and other users. To illustrate, the interests can be based on characteristics of the user (e.g., demographics, current location, place of residence), past messaging history from the user to the messaging bot, a purchase history for the user, a product viewing history for the user, or other interactions by the user that may indicate an interest of the user. Additionally, the commerce system 110 can be associated with a social-networking system that obtains relationships between the user and other users or merchants in a social graph, as described in more detail below with reference to FIG. 10.

In one or more embodiments, the commerce system 110 selects a product offer 302 for providing to the user via the messaging bot. The commerce system 110 can identify the product for the offer based on the user's interests and then provide the offer to the user. For instance, if the user has previously added the messaging bot to a contact list of the user and/or otherwise provided permission to the messaging bot to communicate with the user, the commerce system 110 can cause the messaging bot to provide product offers to the user without the user explicitly requesting a product offer or suggestion and/or without the user initiating a new communications session with the messaging bot.

The commerce system 110 can use queues or triggers for determining when to select a product offer for providing to the user. Specifically, the triggers can be based on a determination that a product offer would be useful for the user in specific circumstances and/or for specific interests of the user. For example, the triggers can use user information to determine whether to provide a product offer to the user that may be useful to the user. To illustrate, the commerce system 110 can determine that the user is near a location that the user frequently visits or where the user purchases one or more products regularly. In another example, the commerce system 110 can determine that the user is performing a certain task, such as browsing products by the merchant via a merchant application or merchant website associated with the merchant system 106.

Additionally, the triggers can use information associated with one or more products to determine whether to provide a product offer to the user. For instance, the commerce system 110 can determine that a new product (e.g., related to another product that the user previously purchased or viewed) is available from the merchant. In another example, the commerce system 110 can determine that a product (e.g., in which the user has previously shown interest) is on sale. The commerce system can use other triggers based on product information, such as seasonal product availability, general popularity of a product, etc. The triggers can also be based on a combination of user-related information and product-related information.

The triggers can include user-determined triggers that allow either the commerce system 110 or the user to determine when to provide a product offer to the user. For instance, the user can set a preference that the user would like to receive offers within certain time periods or according to a certain time schedule, to receive product offers for only products of a certain type, to receive product offers in which the user's friends are interested, etc. Alternatively, the user can opt out of impromptu product offers altogether.

In at least some embodiments, triggers are dynamically determined based on the above-mentioned information and provided to the user when the commerce system 110 determines that the offers would be most helpful to the user. The commerce system 110 can rank and/or weight interests of the user based on the user's message history, purchase history, or other information associated with the user's habits that allow the commerce system 110 to identify whether certain topics interest the user more than others. The commerce system 110 can then determine whether a specific product offer would be interesting to the user based on an algorithm that calculates a score for the offer according to the user's interests. For example, the commerce system 110 can compare a score for the offer to a threshold.

After identifying a product offer based on the user's interests, the commerce system 110 can then initiate a communications session with the user 304. In particular, the commerce system 110 initiates a communications session between the user and the messaging bot via the commerce application 122 on the user client device 104. The commerce system 110 then provides the offer for the product 306 during the communications session for the user to view within the commerce application 122. To illustrate, the commerce system 110 provides the offer for the product as a message from the messaging bot to the user within a messaging thread between the messaging bot and the user. The commerce system 110 can add the message with the offer to a previous messaging thread involving the user and the messaging bot or to a new messaging thread involving the user and the messaging bot.

If the user is interested in the product offer, the user can opt to purchase the product during the communications session. Specifically, the user can cause the user client device 104 to generate a message to purchase the product 308 using the commerce application 122. For example, the user can enter a message addressed to the messaging bot requesting to purchase the product using natural language. The user client device 104 can then send the message 310 with the request to purchase the product to the commerce system 110 so that the messaging bot receives the message from the user within the communications session.

As described previously, the commerce system 110 can then identify the request to purchase the product 312 based on the message from the user. In particular, the commerce system 110 can analyze the message using natural language processing to determine that the user has requested to purchase the product in the message. Additionally, the commerce system 110 can use context information from one or more additional messages, including the message including the product offer from the messaging bot to the user, to determine that the user has requested to purchase a specific product.

After identifying the product and the request to purchase the product, the commerce system 110 identifies payment information 314 for processing the payment transaction. For example, the commerce system 110 identifies a payment credential of the user for processing the payment transaction between the user and the merchant (e.g., by accessing a user account for the user). In one or more embodiments, the commerce system 110 identifies the payment credential based on analyzing the messages using natural language processing and matching the identified payment credential to a stored payment credential for the user. The commerce system 110 can also obtain a payment token associated with the payment credential of the user, a payment amount, a merchant identifier, a user identifier, and/or other information that facilitates processing the payment transaction.

The commerce system 110 then sends the payment information 316 to the merchant system 106 for the merchant system 106 to use in processing the payment transaction. Ad mentioned, the commerce system 110 can communicate the payment information to the merchant system 106 using a secure data transfer that complies with PCI standards. Additionally, although FIG. 3B illustrates a payment transaction process via the merchant system 106, alternative examples include the commerce system 110 processing the payment transaction directly with the payment network 114.

Upon receiving the payment information from the commerce system 110, the merchant system 106 initiates the payment transaction 318 with the user to allow the user to purchase the identified product. The merchant system 106 identifies the payment token from the received payment information and also identifies the payment amount, purchase information, and other information (e.g., user information) for processing the payment transaction. The merchant system 106 can decrypt any encrypted data to identify the corresponding payment information for processing the payment transaction. Alternatively, the merchant system 106 may pass encrypted data to the payment network 114.

The merchant system 106 then sends the payment information 320 (e.g., the payment token and any other payment information) to the payment network 114. The payment network 114 uses the received payment information to determine a payment authorization number associated with the payment transaction. For example, the payment network 114 can determine the payment authorization number 322 from a payment token by identifying the payment authorization number from a mapping of payment authorization numbers to payment tokens. The payment network 114 can then process the payment transaction 324 between the user and the merchant associated with the merchant system 106 by transferring funds from the payment credential of the user to a payment credential of the merchant.

In still further embodiments, rather than sending the payment information (e.g., a payment token) to the merchant system, the commerce system 110 can send the payment information directly to the user client device 104. Specifically, the commerce system 110 receives the message 310 and identifies a personal authorization number for the user. In particular, the commerce system 110 can identify the payment authorization number from the user. The commerce system 110 uses the payment authorization number to generate a token request message. Specifically, the commerce system 110 generates a token request message to request a payment token associated with the identified payment authorization number. The token request message includes the payment authorization number and identification information that allows the card network system 118 to verify the identity of the consumer and/or the token requestor (i.e., the commerce system 110). The commerce system 110 requests the card network system 118 to provide the payment token for use in processing payment transactions for the consumer, rather than using the payment authorization number.

In one or more embodiments, identification information included in the token request message includes a token requestor identifier. For example, the token requestor identifier can be a unique identifier that the card network system 118 previously assigned to the commerce system 110. To illustrate, the token requestor identifier may be a fixed length value of 12 characters. The token requestor identifier is an identifier that allows the card network system 118 to determine an identity of the token requestor from the token request message.

The commerce system 110 then sends the token request message to the card network system 118. Upon receipt of the token request message, the card network system 118 identifies the payment authorization number from the token request message and verifies the authenticity of the payment authorization number. For example, the card network system 118 identifies the payment authorization number in a database of payment authorization numbers associated with the card network system 118. Additionally, the card network system 118 can identify additional information associated with the payment authorization number, such as an identity of the consumer, security information associated with the consumer, and payment transaction information from the token request message, as provided by the server device(s).

In one or more embodiments, the card network system 118 verifies the token requestor using the token requestor identifier in the token request message. The identity of the token requestor allows the card network system 118 to identify a trust level established between the card network system 118 and the commerce system 110. Specifically, the card network system 118 may establish trust relationships with one or more token requestors. For example, each trusted token requestor may request payment tokens from the card network system 118 without requiring additional security information.

Once the identity of the commerce system 110 is verified, the card network system 118 then generates a payment token for the payment authorization number—and in some instances, a cryptogram—for the payment transaction. In particular, the card network system 118 generates a payment token that represents the payment authorization number to entities associated with the payment transaction process. For example, the payment token can be a numerical value with a variable number of digits within a predetermined number of digits (e.g., a variable field of up to 19 digits).

In one or more embodiments, the payment token has the same number of digits as the payment authorization number so that each entity associated with the payment transaction process sees the payment token as a valid payment authorization number. Specifically, the payment token may have a similar or same bank identification number and similar numbering logic as the original payment authorization number. Alternatively, the number of digits may not be based on the payment authorization number, such that the payment token may have a different number of digits than the payment authorization number.

As mentioned, the card network system 118 can generate the cryptogram for use with the current payment transaction. Specifically, the cryptogram is a single-use code or value that ties or scopes the payment token to the current payment transaction. In one or more embodiments, the cryptogram scopes the payment token to the current payment transaction using transaction information such as payment amount, domain, and/or other information that specifically identifies the payment transaction. The cryptogram allows the card network system 118 to verify that the payment token has been authorized for use with the current payment transaction. Thus, the card network system 118 denies requests from merchants to process payment transactions without a cryptogram, such that the card network system 118 denies unauthorized uses of the payment token. Additionally, because the cryptogram is associated with the specific payment transaction, the cryptogram is a single-use cryptogram and may not be used with other payment transactions. In one or more alternative embodiments, the commerce system 110 is allowed to use a cryptogram more than once for subscriptions or other recurring payments. While the figures illustrate the card network system 118 as a single entity, one will appreciate in light of the disclosure herein that the disclosure is not so limited. In particular, the card network system 118, like the commerce system 110, can be implemented across multiple different devices. For example, the card network system 118 can comprise a token provisioning service that is hosted by a separate system than the portion of the card network system 118 that processes payments. The token provisioning service of the card network system 118 can generate the payment tokens and the cryptograms in one or more embodiments.

In one or more embodiments, the commerce system 110, rather than the card network system 118, generates the cryptogram. In such cases, the token request message can include the cryptogram. In any event, the card network system 118 can sent the payment token and optionally the cryptogram to the issuer 120.

The card network system 118 then sends the payment token and optionally the cryptogram to the commerce system 110. According to one or more embodiments, the commerce system 110 associates and stores the payment token with the user profile or user account of the consumer. As described in more detail below, once the commerce system 110 has received a payment token for the consumer, future payment transactions involving the consumer can use the stored payment token instead of the corresponding payment authorization number.

After receiving the payment token from the payment network 112, the commerce system 110 encrypts the payment token. For example, the commerce system 110 encrypts the payment token for providing to the user client-device 104. Specifically, the commerce system 110 can encrypt the payment token using an encryption key. Additionally, the commerce system 110 can encrypt a data package containing the payment token and optionally a cryptogram and/or the user information (or other payment information) to provide to the user client-device 104. The commerce system 110 can also sign the encrypted data package with a key associated with the commerce system 110 to allow the user client-device 104 to verify that the package is from the commerce system 110.

According to one or more embodiments, the commerce system 110 encrypts the payment token and the user information using an encryption key that only the user client-device 104 can decrypt. For example, the commerce system 110 can use a public/private key pair. Thus, the user client-device 104 would then decrypt the payment token and user information and use the information to initiate a payment transaction with the merchant system 106.

Alternatively, the commerce system 110 can encrypt the payment token using an encryption key that the merchant system 106 can also decrypt. For example, the commerce system 110 can encrypt the data package using an encryption key with an associated private key that is passed to the merchant system 106.

In either scenario, the commerce system 110 sends the encrypted payment token (and optionally user information and the cryptogram) to the user client-device 104. For example, the commerce system 110 sends the encrypted payment token and user information to the user client-device 104 in a data package or in a payment transaction message. The commerce system 110 can transmit the data package in a way that is not visible or transparent to the user (i.e., such that the user does not have access to the contents of the data package while encrypted).

Upon receiving the encrypted data package, the user client-device 104 decrypts the payment token (and user information and cryptogram, if applicable). In particular, the user client-device 104 can use the decryption key associated with the encryption key that the commerce system 110 used to encrypt the data package. The user client-device 104 can use the decryption key to extract the information from the data package for use in allowing the user to initiate the payment transaction with the merchant system 106.

The user client-device 104 sends the payment token and user information to the merchant system 106 in accordance with the payment processing procedures that the merchant system 106 uses to process credit or debit card transactions. In one or more embodiments, the payment token includes an obfuscated value of the payment authorization number that appears to be a valid payment authorization number. The merchant system 106, however, may only be able to view the obfuscated value, even after decrypting the data package, such that the merchant system 106 never has access to the actual payment authorization number. Because the obfuscated value can appear to be a valid payment authorization number, the merchant system 106 can still process the payment transaction as if operating with the actual payment authorization number. Additionally, a cryptogram can resemble a security code, such as a code verification value ("CVV number"), so that the merchant system 106 identifies the payment information as valid.

The merchant system 106 then initiates the payment transaction using the information provided from the user client-device 104. Specifically, the merchant system 106 identifies the payment token—as well as a cryptogram, if applicable—from a data package from the user client-device 104. Additionally, the merchant system 106 can identify the payment amount, purchase information (e.g., product or service), user identification information (e.g., name, address, shipping information), and other information for processing the payment transaction. By receiving the payment token from the user client-device 104, the merchant system 106 never receives or sees the payment authorization number associated with the user's payment account. Additionally, the merchant system 106 is not required to integrate with the commerce system 110 because the payment token is requested and passed at the JavaScript layer.

The merchant system 106 sends the payment token and user information to the payment network 112. The payment network 112 can include a payment gateway system that receives the payment token and payment information from the merchant system 106 and sends the payment token and payment information to a card network system to complete the payment transaction. In other embodiments, the payment gateway system can use the payment token to obtain a payment authorization number for submitting to the card network system.

In either case, the payment network 112 determines the payment authorization number and additional payment information (e.g., a cryptogram) to determine whether the payment transaction is valid. For example, the payment network 112 can map the payment token to the payment authorization number in a database. The payment network 112 can search for the payment token in the database to find the payment authorization number in an entry associated with the payment token. Alternatively, the payment token may be an encrypted version (e.g., hashed version) of the payment authorization number, and the payment network 112 can decrypt the payment token to obtain the payment authorization number.

After identifying the payment authorization number, the payment network 112 can process the payment transaction. Specifically, processing the payment transaction involves using the payment authorization number to authorize a transfer of funds from a payment account associated with the payment authorization number to a payment account associated with the merchant. For example, the payment network 112 can transfer funds from the payment account of the user to the payment account of the merchant by communicating with a bank system associated with the merchant.

More specifically, the merchant system 106 sends the payment token and the cryptogram, with the necessary payment transaction information, to the payment gateway system 116. The payment gateway system 116 then sends the payment token, the cryptogram, and the payment transaction information to the card network system 118. The card network system 118 verifies the cryptogram to determine whether the payment transaction is valid. A valid cryptogram signifies to the card network system 118 that the payment transaction is valid, and was initiated via a trusted token requestor and optionally is for a verified amount from a verified merchant.

The card network system 118 also determines the payment authorization number based on the payment token. For example, the card network system 118 can map the network payment token to the payment authorization number in a database. The card network system 118 can search for the payment token in the database to find the payment authorization number in an entry associated with the payment token.

After identifying the payment authorization number, the card network system 118 can process the payment transaction. Specifically, processing the payment transaction involves sending the payment authorization number to the issuer 120 so that the issuer can authorize a transfer of funds from a payment account associated with the payment authorization number to a payment account of the merchant. For example, the issuer 120 can transfer funds from the payment account of the consumer to the payment account of the merchant by communicating with a bank system (acquirer) associated with the merchant.

Alternatively, the card network system 118 can send the payment token to the issuer 120. The issuer 120 then determines the payment authorization number based on the payment token. For example, the issuer 120 can map the payment token to the payment authorization number in a database. The issuer 120 can search for the network payment token in the database to find the payment authorization number in an entry associated with the network payment token. The issuer 120 can authorize a transfer of funds from a payment account associated with the payment authorization number to a payment account of the merchant. For example, the issuer 120 can transfer funds from the payment account of the consumer to the payment account of the merchant by communicating with a bank system (acquirer) associated with the merchant.

As will be described in more detail below, the components of the commerce system 110 as described with regard to FIG. 1, can provide, along and/or in combination with the other components, one or more graphical user interfaces. In particular, the components can allow a user to interact with a collection of display elements for a variety of purposes. In particular, FIGS. 4A-4D and FIGS. 5A-5B and the description that follows illustrate various example embodiments of the user interfaces and features of a commerce application that allow a user to enter into a payment transaction with a merchant while conversing with a messaging bot.

For example, FIGS. 4A-4D illustrate a user client device (or simply "client device") with various views of GUIs provided by a commerce application to facilitate a communications session between a user and messaging bot. Specifically, the commerce application allows the user to converse with the messaging bot (e.g., send electronic messages such as instant messages) within a messaging thread or other electronic communications session. Additionally, the commerce application allows the user to engage in a payment transaction with a merchant associated with the messaging bot from within the communications session. As described in more detail below, the user can view an interface containing content that the commerce system provides within the commerce application.

As illustrated, the client device includes a handheld device. As used herein the term "handheld device" refers to a device sized and configured to be held/operated in a single hand of a user. In additional or alternative example, however, any other suitable computing device, such as, but not limited to, a tablet device, a handheld device (e.g., a smartphone), larger wireless devices, laptop or desktop computer, a personal-digital assistant device, and/or any other suitable computing device can perform one or more of the processes and/or operations described herein.

In one or more embodiments, user can interact with display elements in one or more user interfaces of the commerce application to initiate a communications session with a messaging bot that is associated with a merchant. As mentioned, the commerce application provides one or more interfaces associated with a communications session involving a user and a messaging bot. In one or more embodiments, the commerce application is an application provided by the commerce system, such as a mobile application made available through a mobile application store. Alternatively, the commerce application can be a third-party application that allows the user to access a variety of content, such as a web browser that provides messaging capabilities.

Figure 4B:
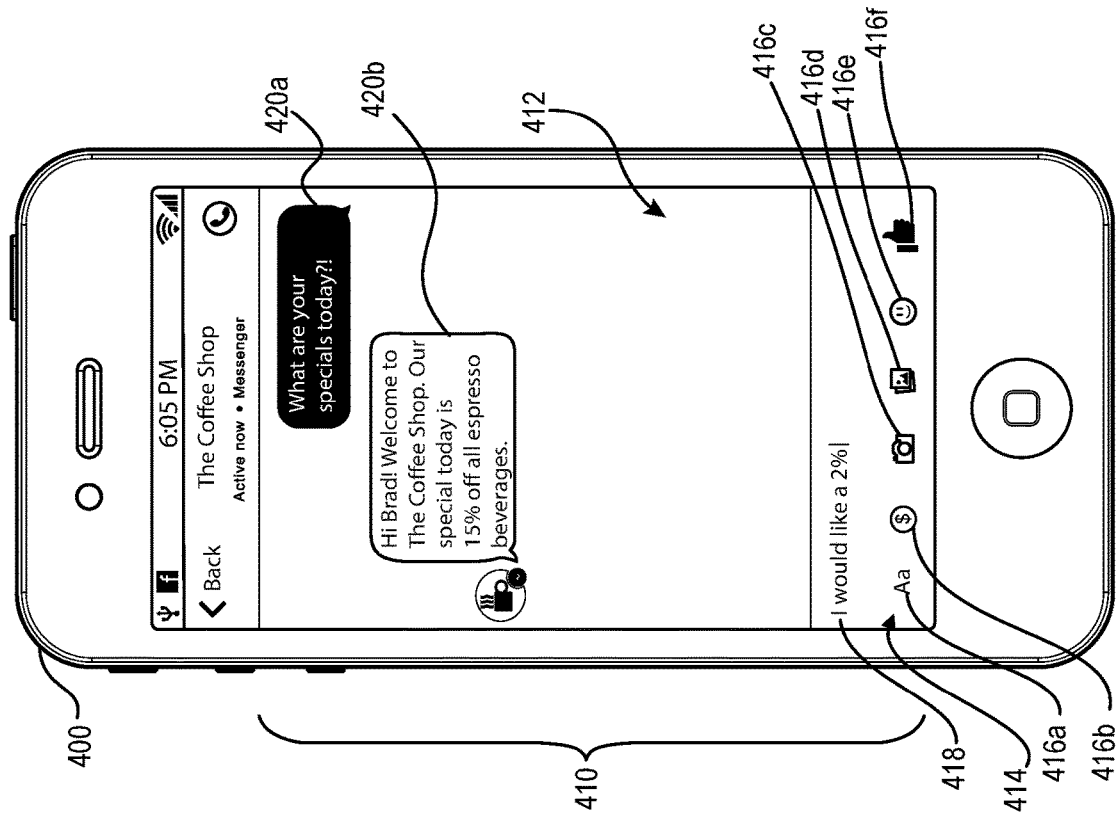
Figure 4A:
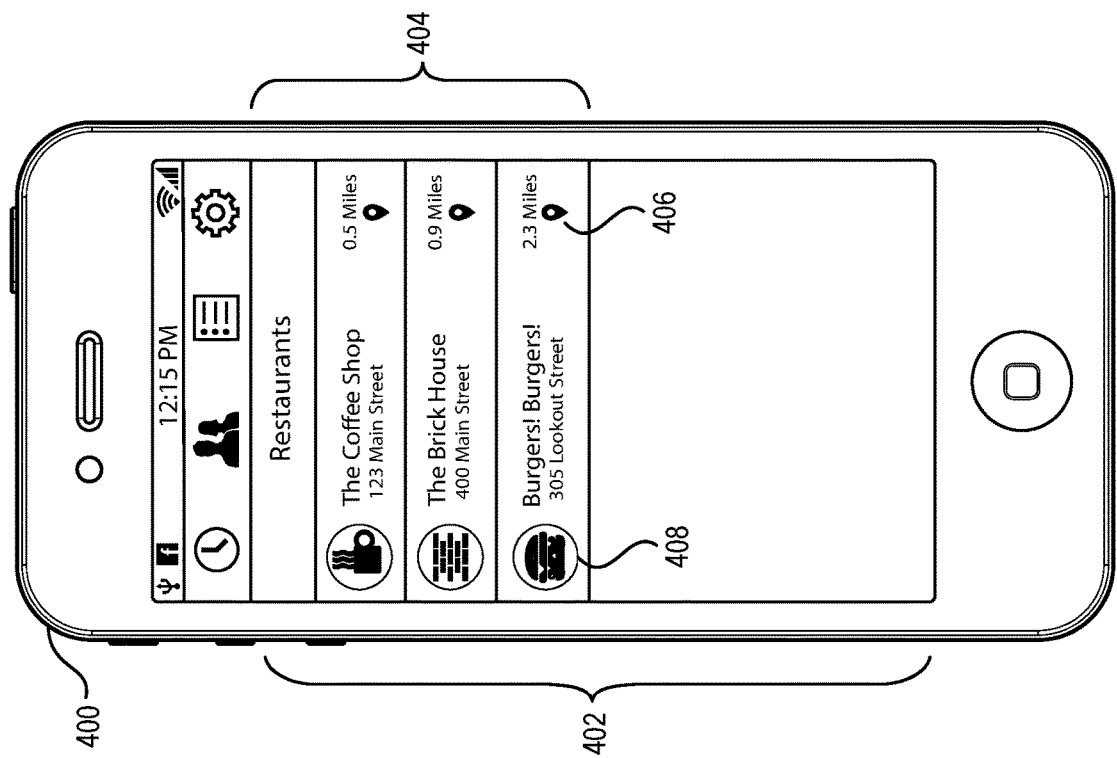

As illustrated in FIG. 4A, a client device 400 includes a touchscreen that can display or provide user interfaces and by way of which user input may be received and/or detected. As used herein, a "touchscreen display" refers to the display of a touchscreen device, such the handheld device described above. Additionally, a touchscreen device is a client device with at least one surface upon which a user may perform touch gestures.

The commerce system can integrate an electronic messaging system and an electronic payment system. FIG. 4A illustrates a merchant user interface 402 that the client device displays on the touchscreen. The merchant user interface 402 can provide a list of merchants 404 near the location of the client device 400. In particular, the merchant user interface 402 can show merchants within a predetermined distance of the current location of the client device 400 of the user. The list of merchants 404 can also show the distance 406 of each merchant with respect to the user's current location. Alternatively, although FIG. 4A illustrates a list of merchants 404 near the user's location, the list of merchants 404 can include any merchants with which the user has previously communicated, for which the user has previously searched or viewed content, or other merchants that may be of interest the user for any reason.

In one or more embodiments, the merchant user interface 402 can provide a list of every known merchant in the predetermined distance. For example, the merchant user interface 402 can collect information for each of the merchants in a specific area and provide the information to the client device. To illustrate, the merchant user interface 402 can provide a name and a location (e.g., an address) of each merchant within the predetermined distance of the user. Alternatively, the merchant user interface can provide information only of merchants registered with the commerce system. In some examples, the user can opt to view all merchants in the list of merchants 404 or only merchants registered with the commerce system.

In still further embodiments the merchant user interface 402 can include merchants that the user follows, is friends with, or that are returned via a search of merchants. For example, a user can follow or friend different merchants. To illustrate, the commerce system can allow the user to interface with a social-networking system to obtain information about relationships the user has with one or more merchants via the social-networking system. The user account of the social-networking system can store merchants that the user follows or friends as contacts of the user.

Additionally, one or more embodiments of the merchant user interface 402 display unique visual indicators associated with the merchants. Specifically, the list of merchants 404 can include icons 408 or logos for the merchants to allow the user to easily and quickly identify the merchants. For example, the commerce application can obtain logos 408 for the merchants from mapping services, online services for the merchants, or based on input from the merchants in association with corresponding user accounts with the commerce system.

From the list of merchants 404 in the merchant user interface 402, the user can view more information about the merchants. Specifically, the user can select a particular merchant in the list of merchants 404 to access additional information about the particular merchant. For example, the user can select the merchant to view business hours, view contact information, an address, a location on a map, a brief description of the merchant, images of products, reviews or links to reviews, a menu or menu link, merchant ratings, or other information about the merchant. In one or more implementations, the merchants can control the type, amount, or content of information available for viewing via the commerce application.

According to one or more embodiments, the user can add the merchant to the user's list of contacts by selecting an option to add the merchant to the user's list of contacts. Additionally, or alternatively, the commerce application can automatically add the merchant to the user's list of contacts in response to a selection by the user to communicate with the merchant (e.g., send a message to a messaging bot associated with the merchant). In one or more additional or alternative embodiments, the commerce application can automatically add the merchant to the user's list of contacts if the user has previously entered into a payment transaction with the merchant via the commerce application or in response to another aspect of the user's activity history within the commerce application.

In one or more embodiments, the commerce application allows the user to view whether the merchant allows users to communicate with a messaging bot associated with the merchant within the commerce application from the list of contacts or from a merchant page. Specifically, the user can determine whether the merchant has a messaging bot registered with the commerce system that allows the user to communicate with a virtual representative of the merchant via the commerce application. For example, the user can identify merchants in the list that are registered with the commerce system by including an identifier that indicates whether a particular merchant has a messaging bot that is available for messaging with the user via the commerce application.

If a particular merchant has a messaging bot that is available for messaging via the commerce application, the user can select an option to initiate a messaging thread with the messaging bot. In particular, the user can select the option to initiate the messaging thread from within the list of merchants 404 or from a merchant page within the commerce application. Additionally, or alternatively, the messaging bot can initiate a messaging thread with the user via the commerce application.

According to one or more embodiments, the commerce system allows the messaging bot to add the user to a list of contacts for the merchant (e.g., a list of current or future customers) based on user preferences or privacy settings. For example, the commerce system can allow the messaging bot to add the user to list of contacts for the merchant in response to determining that the user has selected a preference explicitly allowing merchants to add the user to the list of contacts for the merchant. To illustrate, the user can select a preference that allows merchants to add the user to a list of contacts and/or allow messaging bots to communicate with the user without requiring the merchant to request additional permission from the user.

The user preference can allow messaging bots to interact with the user based on the user's location. Specifically, the user preference can allow a messaging bot to interact with the user if the user is proximate the corresponding merchant's location. For example, when the user enters a predefined proximity near the merchant's location, the commerce system can notify the messaging bot that the user is proximate the merchant's location, allowing the messaging bot to begin messaging the user. Alternatively, the user preference can allow any messaging bot corresponding to a merchant in the user's contacts to contact the user, including merchants that are not located near the user, but with which the user communicates remotely via the commerce application.

For example, the commerce system can identify a location of the client device 400 based on location information that the client device provides to the commerce system on a continuous or intermittent basis in connection with a location-based service. The commerce system can compare the location of the client device 400 with respect to a geo-fence of the merchant (i.e., a virtual perimeter that the commerce system has established for the merchant). When the client device 400 enters the geo-fence, the commerce system can determine that the client device 400 is proximate the location of the merchant, and the messaging bot can begin messaging the user. In alternative examples, the messaging bot is allowed to interact with the user irrespective of the user's location.

As described above, the commerce system can facilitate receiving and sending data. In one or more embodiments, the commerce system facilitates receiving and sending electronic communications between the user and the messaging bot via the commerce application on the client device. Also, in one or more embodiments, the commerce application displays electronic communications sent and received in connection with the messaging interaction. In one or more embodiments, the commerce application displays electronic communications sent and received in a messaging thread within a messaging interface. Initiating a messaging conversation with the messaging bot allows the user and merchant to exchange messages within a messaging thread. For example, initiating the messaging conversation can open a messaging user interface 410 at the client device 400, as illustrated in FIG. 4B. The messaging user interface 410 can present a communications session between the user and a messaging bot associated with a merchant. For example, in the embodiment of FIG. 4B, the messaging user interface 410 includes a conversation in a communications session (referred to as a "messaging thread" 412) between a user ("Brad") and a messaging bot indicative of the corresponding merchant ("The Coffee Shop").

Given the flexible nature of the commerce application, the user can communicate with the messaging bot about a variety of topics. Specifically, the user can request information from the messaging bot that allows the user to determine a product to purchase and how to purchase the product. Additionally, or alternatively, the user can communicate with the messaging bot about one or more products provided by the merchant; a past, present, or future payment transaction; sales or discounts; business hours; or any other information that the messaging bot can provide to the user in connection with the merchant.

Because the user can communicate with a messaging bot that uses natural language processing to analyze the messages (i.e., the commerce system analyzes messages for the messaging bot), the user can compose messages using natural language. Communicating with the messaging bot with natural language may allow the user to more easily and more clearly obtain relevant information without having to wait to converse with a live representative, call the merchant, or obtain the relevant information in person. The commerce system can then analyze the messages from the user to interpret the messages and determine context/details associated with the messaging thread 412 between the user and the messaging bot.

As shown, the messaging user interface 410 can include a messaging thread 412 that includes electronic messages sent from an account of a user of the client device 400. Similarly, the messaging thread 412 can include electronic messages received by the messaging bot associated with the merchant. In one or more embodiments, the commerce application organizes the messaging thread 412 such that new messages are added to the bottom of the messaging thread 412 so that older messages are displayed at the top of the messaging thread. In alternative embodiments, the commerce application may organize the messages in any manner that may indicate to a user the chronological or other relationship between the messages.

The commerce application provides a variety of electronic communication characteristics to help a user distinguish between electronic communications in the messaging thread. For example, as illustrated in FIG. 4B, the commerce application displays the electronic messages sent from an account of the user of the client device 400 pointed toward one side (i.e., the right side) of the messaging interface. On the other hand, the commerce application displays the electronic messages received by the messaging bot pointed toward the opposite side (i.e., the left side) of the messaging interface. In one or more embodiments, the positioning and orientation of the electronic messages provides a clear indicator to a user of the client device of the origin of the various electronic communications displayed within the messaging interface.

Another characteristic provided by the commerce application that helps a user distinguish electronic communications may be a color of the electronic communications. For example, as shown in FIG. 4B, the commerce application displays, within the messaging user interface 410, sent electronic messages in a first color and received electronic messages in a second color. In one or more embodiments, the first and second colors may be black and white, respectively, with an inverted typeface color. In an alternative embodiment, the commerce application may display the electronic messages with white backgrounds and different colored outlines.

In yet another alternative embodiment, the commerce application may display the electronic messages with backgrounds of different patterns, in different fonts, in different sizes or in any other manner that may distinguish the sent electronic messages from the received electronic messages. For example, in one or more embodiments, the commerce application displays sent electronic messages with white typeface on a blue background. Likewise, in one or more embodiments, the commerce application displays received electronic messages with black typeface on a grey background.

The commerce application may also provide a message input control palette or toolbar 414. As illustrated in FIG. 4B, the commerce application displays the message input control palette or toolbar 414 as part of the messaging interface. In one or more embodiments, the message input control palette or toolbar 414 includes a variety of selectable message input controls that provide a user with various message input options or other options. For example, in FIG. 4B, the message input control palette or toolbar 414 includes a text input control 416a, a payment control 416b, a camera viewfinder input control 416c, a multimedia input control 416d, a symbol input control 416e, and a like indicator control 416f. In one or more alternative embodiments, the message input control palette or toolbar 414 may provide the input controls in a different order, may provide other input controls not displayed in FIG. 4B, or may omit one or more of the input controls shown in FIG. 4B.

As will be described below in greater detail, a user may interact with any of the input controls in order to compose and send different types of electronic communications. For example, if a user interacts with the text input control 416a, the commerce application may provide a touchscreen display keyboard in a portion of the messaging user interface 410 that the user may utilize to compose a textual message. As part of the message input control palette or toolbar 414, or as a separate control, the commerce application can include a text input field 418 to allow the user to view and edit text while the user enters the text. If a user interacts with the payment control 416b, the commerce application can allow the user to initiate a payment transaction with the merchant using a keypad interface instead of using natural language to communicate with the messaging bot. Likewise, if a user interacts with the camera viewfinder input control 416c, the commerce application may provide a digital camera interface within a portion of the messaging user interface 410 that the user may utilize to capture, send, and add a digital photograph or digital video to the messaging thread. Similarly, if a user interacts with the multimedia input control 416d, the commerce application may provide a multimedia content item display area (e.g., for displaying digital photographs, digital videos, etc.) within a portion of the messaging user interface 410. Interacting with the symbol input control 416e allows the user to input one or more different symbols (e.g., digital stickers or emojis) into the messaging thread 412. Interacting with the like indicator control 416f allows the user to input a like indicator (e.g., a thumbs up symbol) into the messaging thread 412.

As illustrated in FIG. 4B, the user can engage in a conversation with the messaging bot associated with the merchant. Specifically, the user can compose messages to the messaging bot to request information about products available from the merchant. For example, FIG. 4B illustrates that the user sends a message 420a to the messaging bot in the messaging thread 412 that says, "What are your specials today?!" The messaging bot can analyze the message 420a from the user to obtain the context of the messaging thread 412, including interpreting the request by the user for information about product availability from the merchant and respond to the user.

As described herein, reference to the messaging bot analyzing messages is understood to refer to software/hardware associated with the messaging bot at the commerce system performing natural language analysis of the messages for the messaging bot to use in conversing with users. Similarly, reference to the messaging bot performing any additional functions (e.g., responding to messages or generating messages) is understood to refer to the software/hardware associated with the messaging bot at the commerce system performing the additional functions. Specifically, the commerce system can perform some or all of the operations associated with the messaging bot (e.g., sending/receiving messages, performing language processing, communicating with a corresponding merchant) on behalf of the messaging bot. Thus, the commerce system hosting the messaging bot performs operations in connection with a communications session between the messaging bot and a user.

In response to analyzing the message 420a from the user and interpreting the request, the messaging bot can respond with a response to the request. As illustrated, the messaging bot responds with a message 420b that provides an answer to the request for information (e.g., "Our special today is 15% off all espresso beverages"). In one or more embodiments, the messaging bot communicates with the merchant to obtain the requested information for providing to the user. The messaging bot can obtain the information from the merchant in response to the request. Alternatively, the messaging bot can obtain the information from the merchant prior to the request (e.g., in response to another request or as part of frequent communications with the merchant to reduce answer times from the messaging bot).

Additionally, the messaging bot can use information about the user in responding to the user. In the embodiment of FIG. 4B, the user sends a message to the messaging bot for the first time, such that the user does not have any prior interactions with the messaging bot. As such, the messaging bot can have limited information about the user, such as the user's name. In at least some examples, the messaging bot can gain access to some or all of a user account for the user to obtain information about the user, the user's prior interactions with the messaging bot/merchant, the user's prior interactions with one or more other entities, and/or other information that may provide useful information for the messaging bot, as described in more detail with reference to FIGS. 5A-5B.

The user and the messaging bot can continue exchanging messages within the messaging thread 412 of the messaging user interface 410, as illustrated in FIG. 4C. Specifically, the user can send one or more messages requesting additional information, requesting to purchase a product, and/or verifying information related to one or more of the requests for information or to purchase a product. Additionally, the messaging bot can send one or more messages requesting clarifying information associated with any user requests, providing product offers to the products, providing pricing information, and/or providing responses to user requests.

As illustrated, the user can send a message 422a to the messaging bot to request to purchase a product. The messaging bot can interpret the request to purchase the product based on one or more of the messages of the user and/or the messaging bot. For instance, if the product and a request to purchase the product are in a single message (e.g., message 422a) from the user to the messaging bot (e.g., "I would like a 2% grande latte"), as in FIG. 4C, the messaging bot can identify the request and the product in the single message from the user. Alternatively, if the request to purchase the product is based on a product identified in a previous message from the message bot to the user, or a previous message from the user to the messaging bot, the messaging bot can identify the product from the previous message. Thus, the messaging bot can accurately identify a request to purchase a product even if the request and the identification of the product are in separate messages by the user and/or the messaging bot.

In one or more embodiments, the messaging bot identifies the product in one or more messages of the messaging thread 412 between the user and the messaging bot based on that the user and/or messaging bot provide that indicate a specific product. For example, the messaging bot can identify the product in response to the user naming a specific product (e.g., by providing an exact name for the product). Alternatively, the messaging bot can identify the product in response to the user providing a name that is close to a product or a description of a product offered by the merchant. In yet another example, the messaging bot can identify a plurality of possible products and identify a specific product based on additional context from the messages in the messaging thread 412. In either case, the messaging bot can access a database or listing of products associated with the merchant, either locally or remotely (e.g., stored by the merchant), to determine whether the user has identified one or more products. For example, the messaging bot can assess a social graph (described in greater detail herein below) with nodes/objects for the various products offered by the merchant.

For example, in one or more implementations, the messaging bot can assess a JSON encoded array of potential purchase items. Each JSON object in the array can comprise one or more of a name of the item, an amount of the item, the quantity of the item, and a URL of the product that the user desires to purchase. In still further embodiments, the cart information can comprise product names, product numbers (e.g., Stock-keeping units (SKUs), serial numbers, model numbers), product prices, product quantities, order dates, invoice numbers, and applicable taxes.

Furthermore, the messaging bot can request additional context or clarifying information from the user in one or more additional messages. In particular, if the user provides insufficient information to identify a specific product, the messaging bot can request that the user provide additional information. To illustrate, the messaging bot can send one or more messages asking the user to identify the product from a plurality of possible products. Additionally, the messaging bot can ask the user to verify that the user intended to identify a specific product.

The messaging bot can also identify one or more options, preferences, or configurations associated with the product. Specifically, some products can have multiple different options from which a user may choose. For example, if the product is a latte from a merchant the sells coffee beverages, the user can select a size, add-ins, etc. In various embodiments, changing one or more of the options may or may not change a product identifier or price of the product, depending on the product and/or the merchant. The additional details can allow the merchant to provide the product according to the user preferences.

In one or more embodiments, the messaging bot also identifies the request to purchase the product based on the context of the messaging thread 412. In particular, the context of the messaging thread 412 can indicate that the user wants to purchase a specific product. For example, the messaging bot can analyze messages by the messaging bot and/or the user to identify a request to purchase the product. To illustrate, the user can explicitly request to purchase the product or imply a request to purchase the product in one or more messages. In yet another example, the user can respond to a question by the messaging bot asking the user if the user wants to purchase the product. In any case, the messaging bot determines whether the user requests to purchase the product based on words, phrases, and/or other natural language indications that the user wants to purchase the product.

After identifying the product and the request to purchase the product, the messaging bot can send one or more messages requesting verification of the request to purchase the product. In particular, because of the flexibility of the messaging thread and the ability of the user to request information and initiate a payment transaction process to purchase a product, the messaging bot may require a final verification from the user. For example, the messaging bot can send a verification message 422b to the user requesting, in natural language, that the user verify the request information (e.g., product, price), and the user can send a message verifying the information. A final verification can help prevent accidental orders or incorrect product information.

After verifying the request information, the messaging bot can send one or more messages requesting additional information to begin processing the payment transaction for the user to purchase the product. FIG. 4D illustrates the messaging bot and the user exchanging messages to identify payment information for processing the payment transaction. For example, the messaging bot can send a message requesting the user to provide a method of payment. To illustrate, the messaging bot can generate a message 424a to the user that says, "How would you like to pay?"

In one or more embodiments, the user provides a method of payment in a message 424b using natural language. Specifically, the user can identify the method of payment using one or more keywords, identifiers, or phrases. For instance, the user can name a payment credential using a name or nickname associated with the payment method (e.g., "VISA"). The messaging bot can analyze the messages in the messaging thread to determine that the user has selected the payment method to use for the payment transaction. Alternatively, if the user has not previously input a payment credential, the commerce application can redirect the user to an interface to input the payment information.

Additionally, the messaging bot can access a user account for the user to identify the payment method associated with the name, nickname, identifier, or keyword in the message from the user to the messaging bot. For example, the messaging bot can access the user account for the user via the commerce system and determine a payment method associated with the user account. To illustrate, the name, nickname, identifier, or keyword entered by the user in the message can be mapped to a payment method. The messaging bot can determine the payment method based on the mapping and select the payment method for processing the payment transaction. Alternatively, the messaging bot can access a default payment method for the user from the user account and offer to use the default payment method for the payment transaction.

In one or more embodiments, after the user sends a message to purchase the product, the messaging bot can initiate the payment transaction. In particular, the messaging bot (i.e., the commerce system) can use the payment information, including the product identifier, the payment amount, a user identifier, a merchant identifier, and a payment token or payment credential to process the payment transaction. For example, the messaging bot can send the payment information to the merchant to allow the merchant to initiate the payment transaction. Alternatively, the messaging bot can initiate the payment transaction on behalf of the merchant by processing the payment transaction directly with a payment network associated with the payment transaction.

Once the payment transaction is initiated, the messaging bot can send one or more messages to the user indicating that the payment transaction is initiated successfully. For example, the messaging bot can send a message 424c to the user indicating that the order to purchase the product using the selected payment method was successful. Additionally, if applicable, the messaging bot can send a message 424d to the user indicating an order number of other identifier associated with the payment transaction for the user's records and/or for obtaining the product when the product is ready for the user to pick up. The messaging bot can also send any other relevant information to the user within the messaging thread to allow the user to complete the purchase, obtain the product, and/or store information associated with the payment transaction for later use (e.g., for use in returning the product for a refund).

Figure 5B:
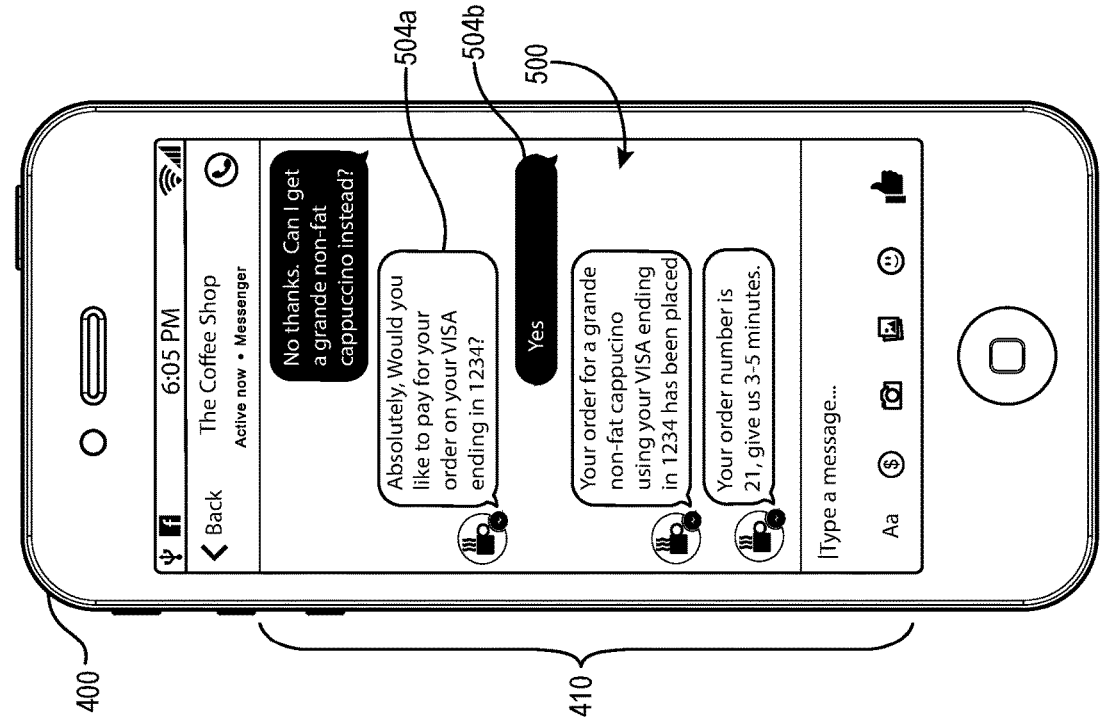
FIGS. 5A-5B illustrate user interfaces for initiating a payment transaction as described in reference to FIGS. 3A-3B in accordance with one or more embodiments.
Figure 5A:
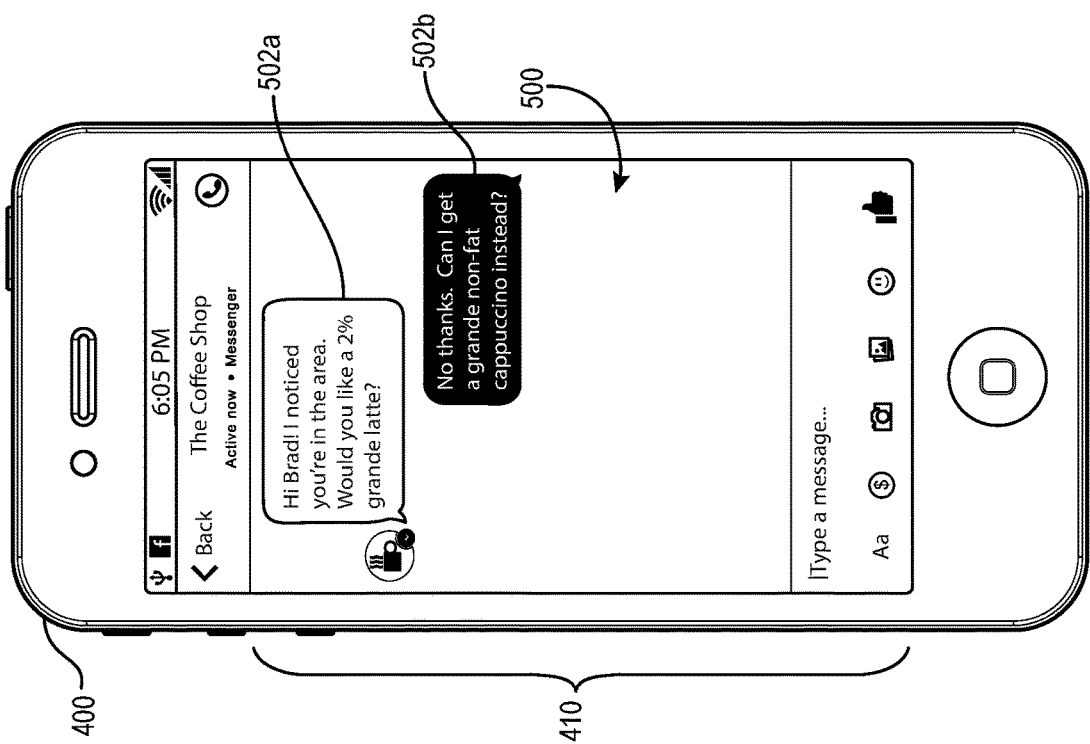

Although FIGS. 4A-4D illustrate an embodiment in which a user interacts with a messaging bot for the first time, users can interact with messaging bots numerous times. For instance, a user can interact with a messaging bot after purchasing a first order from the corresponding merchant. The user can then interact with the messaging bot to obtain information about additional products and/or to purchase additional products from the merchant. In one or more embodiments, the user also provides permission (e.g., via a preference associated with the commerce system) to the messaging bot to initiate communications sessions with the user. For instance, FIGS. 5A-5B illustrate an embodiment in which the messaging bot initiates a messaging thread 500 with the user of FIGS. 4A-4D via the client device 400.

In one or more embodiments, the messaging bot can identify information associated with the user and/or a product to provide offers to the user. Specifically, if the user has provided permission to the messaging bot to initiate messaging threads with the user, the messaging bot can initiate a messaging thread 500 to provide a product offer to the user within the messaging user interface 410. For example, the messaging bot can send a message to the user with an offer for a product based on the messaging bot determining that the user may be interested in the offered product. The messaging bot can use one or more criteria for determining that the user may be interested in the product.

According to one or more embodiments, the messaging bot uses information associated with a user account of the user to determine that the user may be interested in a product. For example, the user account can include interests of the user in one or more products, product types, or topics related to a product or products. To illustrate, if the user account of the user includes one or more interests in a product, the messaging bot can send a message to the user with an offer for the product based on the identified interest from the user account.

As previously mentioned, the user interests can be based on a history of user interactions with the messaging bot or with other messaging bots (e.g., messages associated with the user that indicate a particular interest and contexts of messaging threads), a purchase history of the user, a contact (e.g., friend) list of the user, interests of the user's contacts/friends, device or status information of the user, and/or any other information that can indicate a potential interest of the user in a product. For example, if the user has previously purchased a product, the messaging bot can determine that the user may be interested in the same product or a similar product. Additionally, the messaging bot can use location information associated with the user to determine that because the user is in a specific area at a specific time, the user may be interested in purchasing a product that the user may or may not have previously purchased. FIG. 5A illustrates that the messaging bot sends a message 502a to the user with a product offer, using natural language, for the user to purchase a product that the user previously purchased at that location ("2% grande latte").

In response to the message, the user can send a message to the messaging bot for the user to accept or decline the product offer. Alternatively, the user can send a message to the messaging bot indicating a request to purchase a different product from the merchant. For example, the user may not wish to purchase the same product, but may still wish to purchase a similar product from the merchant. To illustrate, the user can send a message 502b requesting to purchase a product from the merchant in response to the product offer, even though the requested product is different than the offered product (e.g., a "grande non-fat cappuccino" rather than the offered "2% grande latte"). The messaging bot can analyze the message to indicate the decline of the product offer and the request to purchase a different product.

As illustrated, the messaging bot can initiate the new messaging thread 500 with the user to provide an offer even without the user explicitly expressing an interest in the offered product. The user can then converse with the messaging bot using natural language to accept, alter, or decline the offer. The messaging bot can thus potentially anticipate the user's needs or desires and provide the offer. Anticipating the user's needs or desires can improve communication between the user and the merchant and increase customer satisfaction.

If the user accepts the offer or requests to purchase a different product in response to the offer, the messaging bot can send a verification message to allow the user to verify the purchase for the requested product. In particular, the messaging bot can send a message 504a to the user requesting that the user provide payment information, as illustrated in FIG. 5B. For example, the messaging bot can ask the user if the user would like to use a default payment method, which may be the most recently used payment method. The message 504a can also include other purchase information, such as the product, a price, and/or other purchase information to allow the user to verify the purchase for the requested product prior to initiating the payment transaction. If the user wishes to change any of the purchase information (e.g., the payment method), the user can send a message to the messaging bot indicating the request to change the purchase information. Alternatively, the user can send a message 504b with an affirmative response to verify the information in the message 504a from the messaging bot.

After the user has verified the payment information for the purchase of the requested product, the messaging bot can initiate the payment transaction between the user and the merchant and send one or more messages indicating that the payment transaction was initiated successfully. Additionally, the messaging bot can send one or more messages with the purchase information and/or any other payment information that may be useful to the user. The messaging bot can then store the purchase information with the user account for use in refining the user's interests and for use in future payment transactions or product offers.

FIGS. 1-5B, the corresponding text, and the examples, provide a number of different systems and devices for processing electronic payment transactions using a messaging bot. In addition to the foregoing, embodiments can be described in terms of flowcharts comprising acts and steps in a method for accomplishing a particular result. For example, FIG. 6 illustrates a flowchart of an exemplary method in accordance with one or more embodiments.

Figure 6:
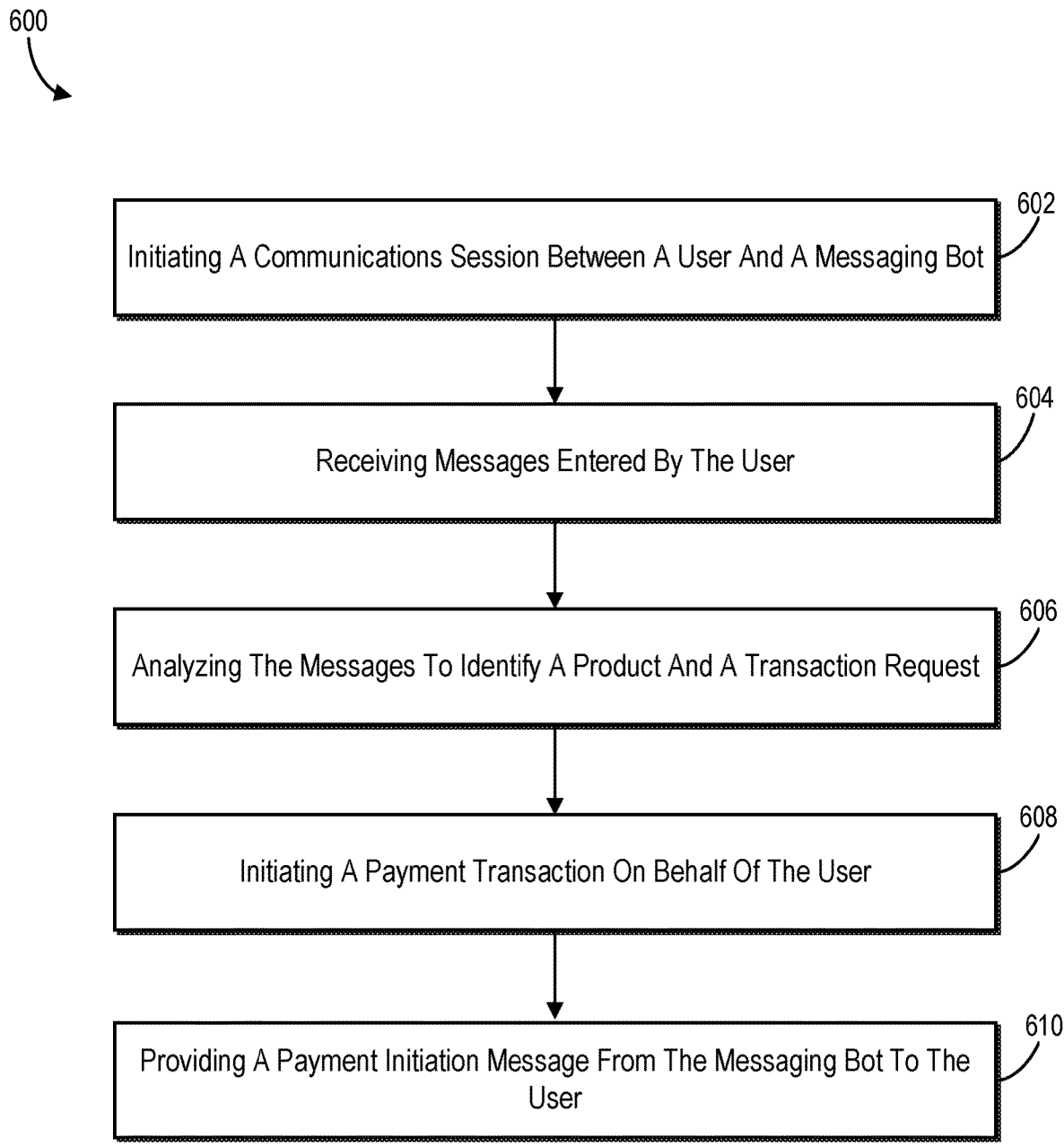
FIG. 6 illustrates a flow chart of a series of acts in a method of processing payment transactions using messaging bots in accordance with one or more embodiments.

FIG. 6 illustrates a flowchart of a method 600 of processing payment transactions using messaging bots. The method 600 includes an act 602 of initiating a communications session between a user and a messaging bot. For example, act 602 involves initiating a communications session between a user and a messaging bot associated with a merchant, the messaging bot comprising an artificial intelligence messaging service.

Act 602 can involve initiating a messaging thread 412, 500 involving the user and the messaging bot via a social-networking system at the one or more servers. To illustrate, the messaging thread 412, 500 can involve an instant messaging thread between the user and the messaging bot. Act 602 can involve initiating the messaging thread 412, 500 in response to a request by the user to initiate the messaging thread 412, 500. Act 602 can alternatively involve initiating the messaging thread 412, 500 in response to a request by the messaging bot to initiate the messaging thread 412, 500.

The method 600 can also include identifying a preference associated with the user indicating that the messaging bot is allowed to initiate messaging threads with the user. Additionally, the method 600 can include identifying a preference associated with the user indicating that the messaging bot is allowed to provide product offers to the user. A product offer can include an offer for a product in which the user might be interested based on one or more identified interests of the user.

The method 600 also includes an act 604 of receiving messages entered by the user. For example, act 604 involves receiving one or more messages entered by the user into a messaging user interface 410 for the communications session between the user and the messaging bot. Act 604 can also involve displaying the one or more messages entered by the user in the messaging thread 412, 500 with one or more messages from the messaging bot to the user in the messaging user interface 410. Additionally, act 604 can involve displaying the one or more messages entered by the user and one or more messages from the messaging bot to the user in chronological order.

The method 600 further includes an act 606 of analyzing the messages to identify a product and a transaction request. For example, act 606 involves analyzing, using natural language processing, the one or more messages to identify a product and a request to complete a transaction between the user and the merchant for the product. Act 606 can involve identifying, using natural language processing, a description of the product in the one or more messages entered by the user into the messaging user interface 410.

Act 606 can also involve identifying the product based on a mapping of the description of the product to a product identifier in a database of products associated with the merchant. For instance, act 606 can involve accessing a database associated with the merchant in response to identifying the description of the product, and identifying, in the database, the product based on a mapping of the description of the product to a product identifier for the product.

Act 606 can also involve analyzing one or more messages for the communications session to determine a context of the communications session based on the one or more messages. As part of act 606, or as an additional act, the method 600 can include providing, during the communications session and based on the determined context, a message 502a comprising a suggestion from the messaging bot to the user to purchase the product. For example, the context can include information from the one or more messages entered by the user or from one or more messages from the messaging bot, the information indicating a desire by the user to view information about a product or to purchase a product.

The method 600 can also include identifying one or more interests of the user based on a user account associated with a social-networking system, and providing, during the communications session and based on the identified one or more interests, a message 502a comprising a suggestion from the messaging bot to the user to purchase the product. For example, the method 600 can include accessing a message history, a purchase history, device information for a client device, location data, an interaction history with users or messaging bots of the commerce system, or information from a social graph of a social-networking system for the user to identify the one or more interests of the user. Additionally, the method 600 can include identifying product information to identify one or more products to provide to the user from the messaging bot in a product offer.

Additionally, the method 600 includes an act 608 of initiating a payment transaction on behalf of the user. For example, act 608 involves initiating a payment transaction on behalf of the user based on analyzing the one or more messages using natural language processing. Act 608 can further involve initiating and completing the payment transaction between the user and the merchant within a messaging flow of the communications session and without redirecting a client device of the user away from the messaging user interface to complete the payment transaction.

As part of act 608, or as an additional act, the method 600 can include providing, to the merchant in response to identifying the product and the request, a request to initiate the payment transaction between the user and the merchant, and receiving, from the merchant, a response indicating that the payment transaction was initiated. For example, the method 600 can include providing, to the merchant, payment information and a product identifier for completing the payment transaction.

The method 600 can also include processing the payment transaction on behalf of the user by sending payment information to the merchant to allow the merchant to process the payment transaction with a payment network associated with the payment transaction. Alternatively, the method 600 can include processing the payment transaction on behalf of the user and the merchant by sending payment information to a payment network associated with the payment transaction.

The method 600 also includes an act 610 of providing a payment initiation message from the messaging bot to the user. For example, act 610 involves providing, in connection with the communications session, a payment initiation message from the messaging bot to the user indicating that the payment transaction was initiated. Act 610 can also involve entering the payment initiation message in the messaging thread according to a chronological order of messages between the user and the messaging bot.

Figure 7:
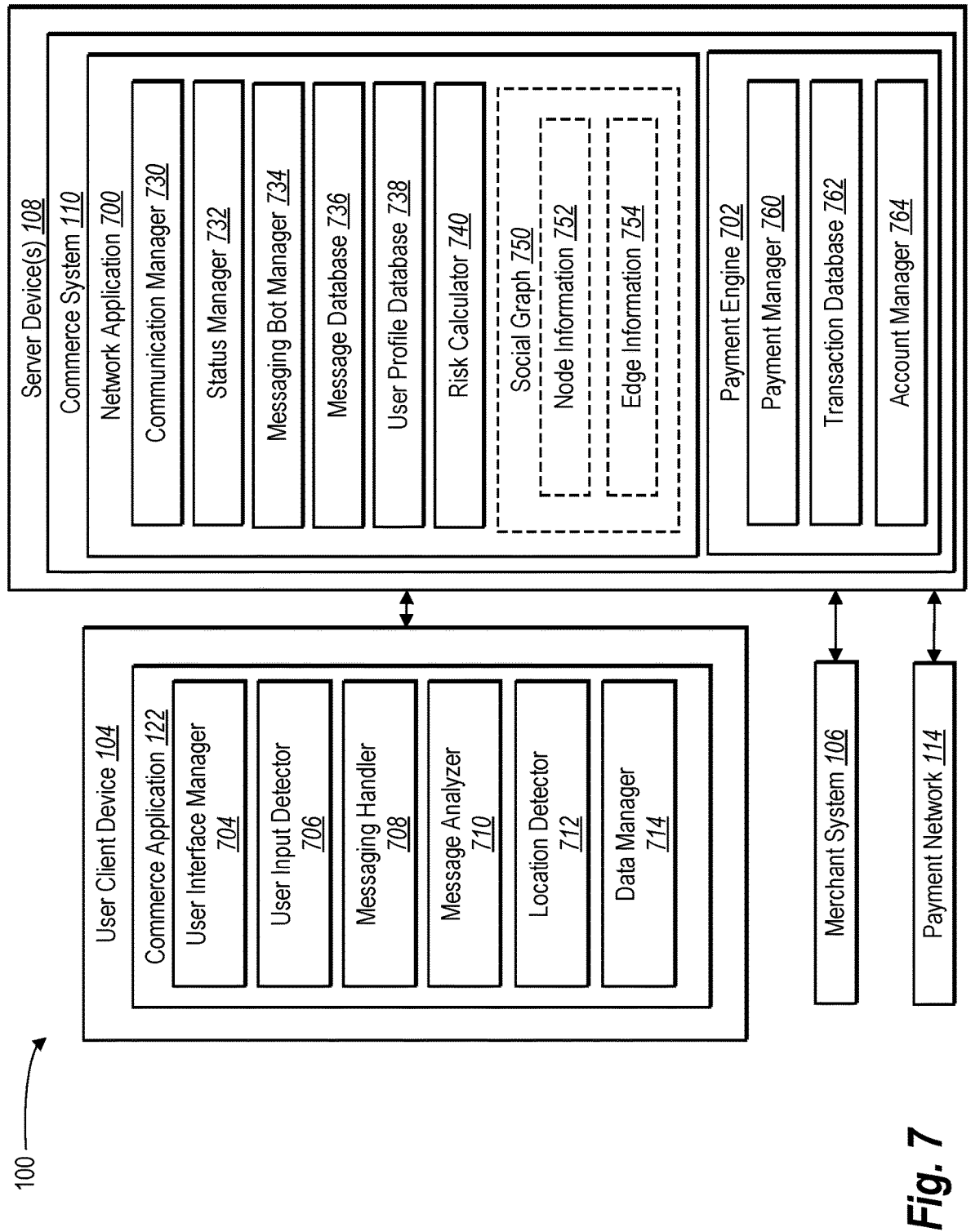
FIG. 7 illustrates a detailed schematic diagram of the example system of FIG. 1 in accordance with one or more embodiments.

FIG. 7 illustrates a schematic diagram illustrating additional details of the environment of FIG. 1 that includes the commerce system 110. As shown, the environment can include a user client device 104, a merchant system 106, server device(s) 108 that include the commerce system 110, and a payment network 114. Additionally, the payment network 114 includes the payment gateway system 116, the card network system 118 associated with a payment authorization number, and the issuer 120 as described above in relation to FIG. 1. In general, the commerce system 110 allows a user associated with the user client device 104 to send a payment to a merchant associated with the merchant system 106 by communicating with a messaging bot that is associated with the merchant system 106.

FIG. 7 illustrates that the user client device 104 include a commerce application 122 (an e-commerce application or a web browser), and the server device(s) 108 include a network application 700 and a payment engine 702 with various components. The components of the network application 700, the components of the payment engine 702, and the commerce application 122 can work together to allow a user to send payments to a merchant, as described in greater detail below.

The commerce application 122 of FIG. 7 includes a user interface manager 704, a user input detector 706, a message handler 708, a message analyzer 710, a location detector 712, and a data manager 714. FIG. 7 illustrates that the network application 700 includes a communication manager 730, a status manager 732, a message bot manager 734, a message database 736, a user profile database 738, and a risk calculator 740. As described below, the network application 700 can also optionally include a social graph 570, which includes node information 572 and edge information 574. FIG. 7 further illustrates that the payment engine 702 includes a payment manager 760, a transaction database 762, and an account manager 764. Each of the components of the user client device 104, the merchant system 106, and the server device(s) 108 can communicate with each other or with components using any suitable communication technologies. It will be recognized that although the components of the client devices 104 and the server device(s) 108 are shown to be separate in FIG. 7, any of the components may be combined into fewer components, such as into a single facility or module, or divided into more components as may serve a particular embodiment. While FIG. 7 describes certain components as part of the commerce application 122 and other components as part of the network application 700 or payment engine 702, the present disclosure is not so limited. In alternative embodiments, one or more of the components shown as part of the commerce application 122 can be part of the network application 700 or payment engine 702, or vice versa. Similarly, one or more components shown as part of the network application 700 can be part of the payment engine 702 or vice versa.

The components can include software, hardware, or both. For example, the components can include computer instructions stored on a non-transitory computer-readable storage medium and executable by at least one processor of the server device(s) 108. When executed by the at least one processor, the computer-executable instructions can cause the server device(s) 108 to perform the methods and processes described herein. Alternatively, the components can include hardware, such as a special purpose processing device to perform a certain function or group of functions. Additionally, the components can include a combination of computer-executable instructions and hardware.

In one or more embodiments, the commerce application 122 is a native application installed on a client device. For example, the commerce application 122 may be a mobile application that installs and runs on a mobile device, such as a smart phone or a tablet. In another example, the commerce application 122 can be a desktop application, widget, or other form of a native computer program. Alternatively, the commerce application 122 may be a remote application that the client device accesses. For example, the commerce application 122 may be a web application that is executed within a web browser of the client device.

The commerce application 122 on the user client device 104 facilitates payment transactions with other users (e.g., peer users or merchants). For example, the commerce application 122 can facilitate the sending of a payment associated with a payment transaction. In particular, the commerce application 122 can communicate with the network application 700, the payment engine 702, and the merchant system 106 to send and receive information associated with payment transactions. For example, the commerce application 122 can send and receive payment tokens or other tokens associated with payment transactions.

As mentioned above, and as shown in FIG. 7, the commerce application 122 can include a user interface manager 704. The user interface manager 704 provides, manages, and/or controls a graphical user interface (or simply "user interface") that allows a user to compose, view, send, and receive messages, as well as send and receive payments. For example, the user interface manager 704 can provide a user interface that facilitates the composition of a message, such as an instant message, for sending to another user, such as a messaging bot. The user interface manager 704 can also provide user interfaces for engaging in performing one or more functions associated with a social-networking system, such as viewing contacts or interacting with content from other users of the social-networking system.

More specifically, the user interface manager 704 may facilitate the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 704 may direct the client device to display a group of graphical components, objects and/or elements that enable a user to view a messaging thread.

In addition, the user interface manager 704 may direct the client device to display a one or more graphical objects or elements that facilitate user input for composing and sending a message. To illustrate, the user interface manager 704 may provide a user interface that allows a user to provide user input to the commerce application 122. For example, the user interface manager 704 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As further illustrated in FIG. 7, the commerce application 122 can include a user input detector 706. In one or more embodiments, the user input detector 706 can detect, receive, and/or facilitate user input in any suitable manner. In some examples, the user input detector 706 can detect one or more user interactions with respect to the user interface. As referred to herein, a "user interaction" means a single interaction, or combination of interactions, received from a user by way of one or more input devices.

For example, user input detector 706 can detect a user interaction from a keyboard, mouse, touch pad, touchscreen, and/or any other input device. In the event the client device includes a touchscreen, the user input detector 706 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 706 may additionally, or alternatively, receive data representative of a user interaction. For example, user input detector 706 may receive one or more user configurable parameters from a user, one or more user commands from the user, and/or any other suitable user input. The user input detector 706 may receive input data from one or more components of the commerce application 122, from the storage on the user device 104, or from one or more remote locations (e.g., the network application 700).

As further illustrated in FIG. 7, the commerce application 122 includes a message handler 708 that manages messages provided to or sent from the commerce application 122. For example, the message handler 708 can interact with the user interface manager 704 and the user input detector 706 to coordinate the sending and receiving of messages using the commerce application 122. The message handler 708 may direct the sending and receiving of messages to and from the network application over the course of an electronic messaging session among a plurality of participants. The message handler 708 may organize incoming and outgoing messages and direct the user interface manager 704 to display messages.

In one or more embodiments, the message handler 708 can facilitate receiving and sending data via the commerce application 122. In particular, message handler 708 can facilitate sending and receiving messages. For example, the message handler 708 can package content to be included in a message and format the message in any necessary form that is able to be sent through one or more communication channels and using an appropriate communication protocol, as described herein. To illustrate, the message handler 708 can send payment transaction information to the server device(s) 108 at various stages of a payment transaction process. Likewise, the message handler 708 can process messages the client device receives from other users.

In addition to providing communication functions for the commerce application 122, the message handler 708 can provide access to message data. For example, the message handler 708 can access data that represents a list of contacts, or one or more groups of contacts, to include and recipients to a message. To illustrate, the message handler 708 can obtain and provide data representing a contact list to the user interface manager 704 to allow the user to search and browse a contact list, and ultimately select an individual contact or group of contacts to include as recipients of a message. In one or more embodiments, a social-networking system can maintain remote contact list data (e.g., a "friends list"), and the message handler 708 can access the contact list data on the social-networking system for use within the commerce application 122.

In addition to the forgoing, the user interface manager 704 can receive instructions or communications from one or more components of the commerce application 122 to display updated message information, updated status of a payment, updated status of a payment transaction, and/or updated available actions. The user interface manager 704 can update an available option based on whether a particular option is available at a particular point within the transaction process. The user interface manager 704 can add, remove, and/or update various other selectable actions within the sender and/or receiver status messages.

As mentioned above, the commerce application 122 can further include a message analyzer 710. The message analyzer 710 can analyze messages sent from and received by the commerce application 122 for events or attachments. In one or more embodiments, the message analyzer 710 can identify events from contextual content in the exchanged messages. For example, the message analyzer 710 can identify payment requests based on contextual information in a text message or instant message sent from the consumer to the merchant. Thus, at least some of the message analysis can occur at the user client device 104. Alternatively, message analysis associated with communications between the user and the messaging bot can occur entirely on the commerce system 110.

The commerce application 122 can further include a location detector 712. The location detector 712 can access or identify a location of the client device based on GPS information from the client device, cell tower triangulation, WIFI received signal strength indication, WIFI wireless fingerprinting, radio-frequency identification, near-field communication, by analyzing messages, or based on data from other sources. The location detector 712 can then provide the location of the client device to the message analyzer 710 or the network application. Additionally, the location detector 712 can receive indications of the location of other client devices from the network application and provide them to the message analyzer 710.

As discussed above, the user client device 104 can include a data manager 714, as illustrated in FIG. 7. The data manager 714 can maintain message data representative of data used in connection with composing, sending, and receiving messages between a user and one or more other users (e.g., a messaging bot). For example, message data can include message logs, contact lists, content, past communications, past payment transactions, and other similar types of data that the commerce application 122 can use in connection with providing the ability for users to communicate using the commerce application 122.

As briefly mentioned above, the commerce system 110 on the server device(s) 108 can further include a network application 700 that is implemented in whole or in part on the server device(s) 108. In one or more embodiments of the present disclosure, the network application 700 comprises a social-networking system (such as but not limited to FACEBOOK™), but in other embodiments the network application 700 may comprise another type of application, including but not limited to an e-mail application, search engine application, banking application, or any number of other application types that utilizes user accounts.

In one or more embodiments where the network application 700 comprises a social-networking system, the network application may include a social graph 750 for representing and analyzing a plurality of users and concepts. Node storage of the social graph 750 can store node information 752 comprising nodes for users, nodes for concepts, nodes for transactions, and nodes for items. Edge storage of the social graph can store edge information 754 comprising relationships between nodes and/or actions occurring within the social-networking system. Further detail regarding social-networking systems, social graphs, edges, and nodes is presented below with respect to FIG. 10.

The communication manager 730 can process messages received from the commerce application. For example, the communication manager 730 can receive and manage payment requests from users. The communication manager 730 may receive one or more messages directed from the user to a messaging bot from the commerce application 122 and pass information associated with the messages from the commerce application 122 to the network application 700 and/or the payment engine 702.

The status manager 732 can track the status of users (e.g., consumer users, messaging bots) in connection with the commerce system 110. For example, the status manager 732 can identify when a user is logged into the commerce application 122, when a user is active on the commerce application 122, when a client device associated with a user or user account is online or active. The status manager 732 can send indications (such as push notifications) to the commerce application 122 to notify the commerce application 122 of the status of users, device, messages, or payments. The user interface manager 704 can add, modify, or otherwise change or update status notifications based on indications received from the status manager 732. For example, the status manager 732 can send an indication to the commerce application 122 indicating that another user has accessed a message, received a payment, sent a payment, is active, a device or device type a co-user is active on (e.g., mobile vs. web), etc. The user interface manager 704 in turn can update a user interface to notify a user of the status.

The network application 700 can also include a messaging bot manager 734. The messaging bot manager 734 can manage one or more messaging bots associated with one or more merchants. For example, the messaging bot manager 734 can provide an API to the merchants to allow the merchants to integrate with the commerce system 110 and generate artificial intelligence messaging services with which users can communicate to obtain information about the merchants and/or to use to enter into payment transactions with the merchants. Specifically, the messaging bot manager 734 can provide computing resources for use in analyzing messages using natural language processing and generating messages using natural language to carry on natural language conversations with users in place of human representatives. Additionally, the messaging bot manager 734 can interpret messages from users to identify context, requests, and/or other information associated with messaging threads between users and messaging bots.

The network application 700 may also include a message database 736. The message database 736 can maintain message data associated with payment transactions related to identities of users or merchants engaging in payment transactions. Specifically, the message database 736 can maintain a history of a user's engagements with one or more messaging bots for use in identifying a user's interests or preferences. For example, the message database 736 can communicate with the user profile database 738 to maintain information representative of the user's interests based on the messaging threads between the user and one or more messaging bots in a user profile for the user, which the social graph 750 can access to influence the node information 752 or edge information 754 for the user. The message database 736 can also redact sensitive information (e.g., payment information) that the commerce system 110 maintains separately from the network application 700. Additionally, or alternatively, such information can be maintained in the transaction database 762, as described below.

As mentioned previously, the server device(s) 108 can include a payment engine 702 having a payment manager 760. The payment manager 760 of FIG. 7 can integrate the sending and receiving of payment requests and initiate payment transactions, and may employ one or more application programming interfaces (APIs). For example, upon the communication manager 730 receiving a payment request in connection with a natural language communication between a user and a messaging bot, the communication manager 730 can send any payment details to the payment manager 760. The payment manager 760 can then use the payment details retrieved from the payment request to initiate a payment transaction using the payment network 114.

According to one or more embodiments, the server device(s) 108 can maintain the payment engine 702 separate from the network application 700. For example, the server device(s) 108 can implement payment processes associated with the payment engine 702 separately from at least some of the functionality of the network application (e.g., using a messaging database for recovery). To illustrate, the server device(s) 108 can implement the functionality of the payment engine 702 on a first group of one or more servers and the functionality of the network application 700 on a second group of one or more servers. Implementing functionality of the payment engine 702 and the network application 700 on separate servers can allow the commerce system to ensure that at least some of the financial information associated with the users is maintained apart from the network application 700 to comply with Payment Card Industry (PCI) standards. Alternative configurations of servers and/or software than those described herein may also allow the server device(s) 108 to comply with PCI standards.

The payment manager 760 can coordinate a transaction corresponding to a payment defined in a payment request. As generally explained above, the payment manager 760 can coordinate a transaction via the payment network 114 that corresponds to a payment request, monitor the status of the transaction, and provide status information regarding the transaction. More specifically, the payment network 114 can authorize a transaction, fund a transaction, and/or settle an individual transaction or batch of transactions. In one or more embodiments, the payment manager 760 can use one or more application programming interfaces (API) to communicate relevant information with the payment network 114.

To complete a transaction, the payment manager 760 can access or obtain payment credentials for the user. Specifically, the payment manager 760 identifies a payment credential (e.g., a payment authorization number) for the user in connection with a payment account of the user. The payment manager 760 can register one or more payment accounts or other payment credentials for the user with the network application 700 (e.g., a payment token). In additional embodiments, the payment engine 702 is also capable of handling payment transactions directly with merchant systems that integrate with the commerce system 110. Thus, the payment engine 702 can also manage payment transactions directly with those merchant systems.

Upon the user registering a deposit account or other payment credential, the user profile database 738 can maintain the payment credential or user information associated with the payment credential for the user. After the payment manager 760 receives the payment information for a payment transaction from a user, the payment manager 760 can identify the recipient. At this point, the payment manager 760 can initiate the transaction using the payment credential information associated with the user.

As mentioned, the user profile database 738 stores user profile information for users. In one or more embodiments, user profile information includes payment credentials (i.e., a payment token representing a payment authorization number, as described previously) for a credit card, a debit card, a deposit account or other bank accounts, gift card accounts, store credit accounts, etc. The user profile database 738 can also store additional information associated with the payment credentials, such as expiration dates, security codes, address information, and/or other information. User profile information can also include one or more default payment method for payment transactions for one or more merchants or co-users. The user profile information can also include identifying information for the user, such as name, address, etc. to allow the payment manager 760 to provide information to the one or more other components in connection with a payment transaction.

In one or more additional embodiments, the payment manager 760 can communicate with the risk calculator 740 to determine a risk associated with a sender, a recipient, and/or a particular payment transaction. Specifically, the risk calculator 740 can determine whether the sender/recipient is a fraudster based on information associated with the sender/recipient in order to prevent fraudulent payment transactions. For example, the risk calculator 740 can determine the likelihood of fraudulent activity based on activity or information associated with the sender/recipient in connection with the network application. Determining a risk associated with users involved in payment transactions can also be useful in determining whether to process a particular payment transaction.

For example, in one or more embodiments, the network application can determine whether a risk associated with a particular user satisfies a predetermined threshold. In particular, the network application can determine whether a user is a fraudster (e.g., a scam account or software posing as a real person) based on a "realness" score. For example, if the risk associated with the sender is below a predetermined threshold (i.e., a high risk level), the network application can determine that the user is likely a fraudster and notify the commerce system 110 that the user is a fraudster. If the user has a high-risk level, the commerce system 110 can stop a payment transaction between the user and the recipient.

In additional embodiments, after determining a risk associated with a user, the network application 700 can perform one or more actions in association with the risk. Specifically, the network application 700 can perform an action that allows the network application 700 to verify the identity of the user. For example, the network application 700 can identify information associated with the user that indicates the user is who the user purports to be. To illustrate, the network application 700 can access the user's purchase history or other stored information in the message database 736 or user profile database 738, which can influence the risk level or realness score of the user.

In additional or alternative embodiments, the network application 700 can automatically perform one or more actions with respect to the payment request or a payment transaction in response to determining a risk level of the user. Specifically, the network application 700 can perform an action that affects the payment request or a corresponding payment transaction between the user and the recipient without requesting additional information from the user. For example, the network application 700 can allow the payment transaction, block the payment transaction, or disable the user's account with the network application 700.

The payment manager 760 can perform various other additional steps and methods in order to effectively manage the payment process. In one or more embodiments, for example, upon initiating a payment transaction the payment manager 760 can generate a transaction identifier (or simply "transaction ID") and associate the transaction identifier with the payment request and/or the payment information within the payment request. For instance, upon generating a transaction ID, the payment manager 760 can send the transaction ID and the payment information to the transaction database 762. The transaction database 762 can include a data table or similar data matrix that stores transaction information according to transaction ID.

The transaction database 762 of FIG. 7 can provide storage for each transaction (such as in the form of a graph object), attempted or completed, the transaction ID, a date, an amount of the transaction, the payment method used, and any other information gathered on the transaction. The transaction database 762 can also store transaction information, such as requests associated with a user and the terms for a particular transaction. With this information, the payment manager 760 can provide, upon request, a summary of one or more transactions to users as a history of payments requested, payments declined and payments completed.

In one or more embodiments, after a transaction ID is associated with a particular payment request, the transaction ID can be included or embedded within substantially all communications within the commerce system relating to the particular payment. As such, the transaction ID allows the payment manager 760 to manage and process a large number of payments in an organized fashion. For example, the payment manager 760 can include instructions to include the transaction ID in any information sent to client devices. In return, the message handlers 712 can also include the transaction ID in any information sent from client devices to allow the payment manager 760 to efficiently and reliably identify a particular transaction to which the information corresponds.

In one or more embodiments, the transaction ID can be associated with one or more user identifiers, merchant identifiers, payment amounts, payment methods (e.g., user accounts), deposit methods (e.g., merchant accounts), transaction history, current transaction status, as well as other transaction information. In one or more embodiments, the transaction database 762 maintains the transaction information in the form of one or more graph objects that are updated with any updates or actions with respect to a transaction.

As mentioned, the commerce system 110 can also include an account manager 764. The account manager 764 can manage one or more temporary accounts in connection with the networking application. For example, upon completion of a payment transaction, the payment manager 760 can deposit the payment amount to a temporary account for a recipient user (i.e., during a payment transaction for which tokenization of a payment authorization number is not available). The payment manager 760 can then settle any payment transactions with funds deposited into the temporary account at a specified time (e.g., at end of day). The payment manager 760 can also cause the communication manager 730 to notify the user of completed payment transactions before or after settling payment transactions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 8 illustrates a block diagram of exemplary computing device 800 that may be configured to perform one or more of the processes described above. One will appreciate that one or more computing devices such as the computing device 800 may implement the commerce system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

The communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the commerce system 100 can comprise a social-networking system. A social-networking system may enable its users (such as persons or organizations) to interact with the system and with each other. As mentioned above, the commerce system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 9:
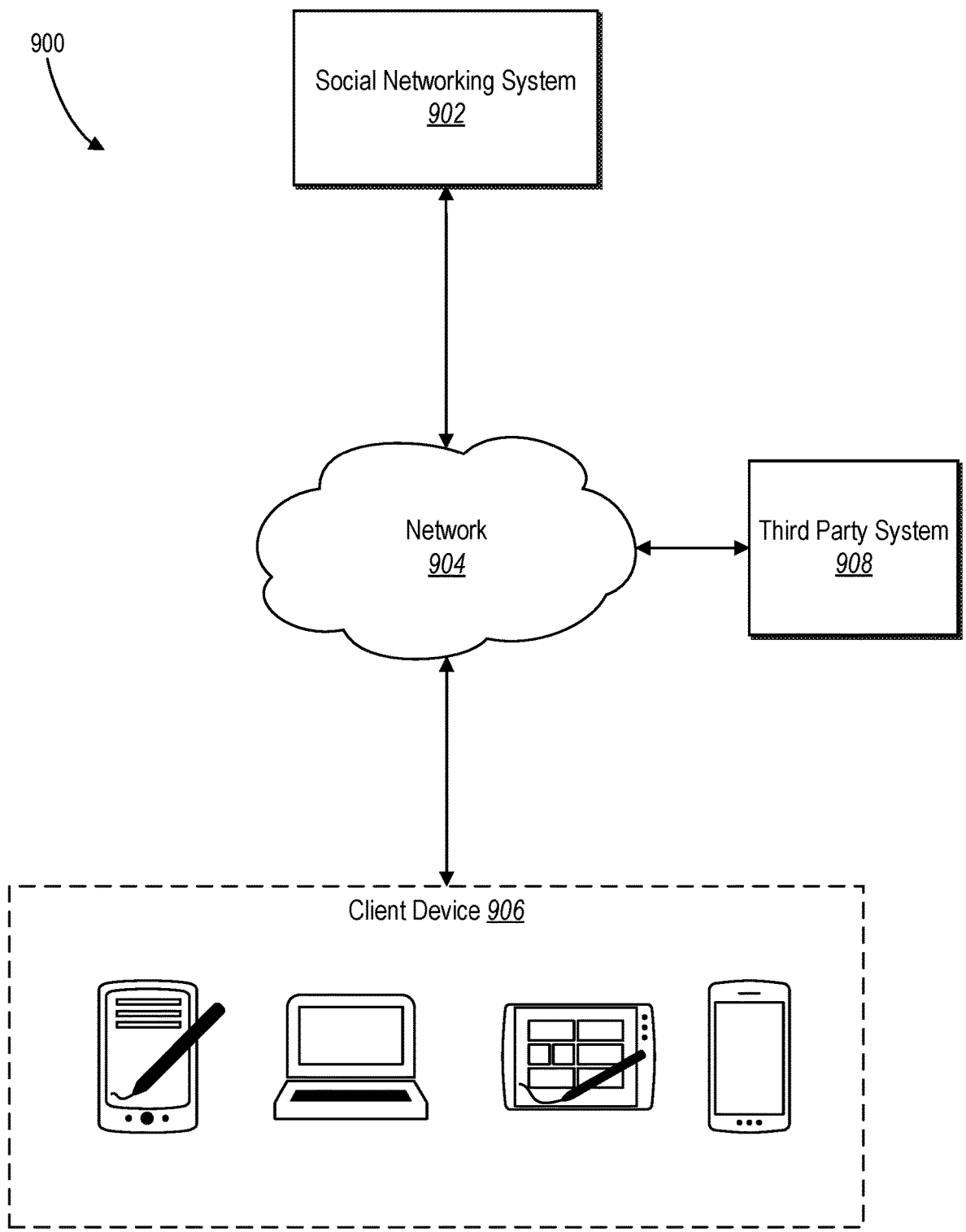
FIG. 9 illustrates an example network environment of a social-networking system in accordance with one or more embodiments.

FIG. 9 illustrates an example network environment 900 of a social-networking system (e.g., a commerce system as described herein). Network environment 900 includes a client system 906, a social-networking system 902, and a third-party system 908 connected to each other by a network 904. Although FIG. 9 illustrates a particular arrangement of client system 906, social-networking system 902, third-party system 908, and network 904, this disclosure contemplates any suitable arrangement of client system 906, social-networking system 902, third-party system 908, and network 904. As an example and not by way of limitation, two or more of client system 906, social-networking system 902, and third-party system 908 may be connected to each other directly, bypassing network 904. As another example, two or more of client system 906, social-networking system 902, and third-party system 908 may be physically or logically co-located with each other in whole or in part. Moreover, although FIG. 9 illustrates a particular number of client systems 906, social-networking systems 902, third-party systems 908, and networks 904, this disclosure contemplates any suitable number of client systems 906, social-networking systems 902, third-party systems 908, and networks 904. As an example and not by way of limitation, network environment 900 may include multiple client system 906, social-networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social-networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 9. A client system 906 may enable a network user at client system 906 to access network 904. A client system 906 may enable its user to communicate with other users at other client systems 906.

In particular embodiments, client system 906 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 902 may be a network-addressable computing system that can host an online social network. Social-networking system 902 may generate, store, receive, and send social-networking data, such as, for example, user-profile data, concept-profile data, social-graph information, or other suitable data related to the online social network. Social-networking system 902 may be accessed by the other components of network environment 900 either directly or via network 904. In particular embodiments, social-networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social-networking system 902, or a third-party system 908 to manage, retrieve, modify, add, or delete, the information stored in data store.

In particular embodiments, social-networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 902 may provide users of the online social network the ability to communicate and interact with other users. In particular embodiments, users may join the online social network via social-networking system 902 and then add connections (e.g., relationships) to a number of other users of social-networking system 902 whom they want to be connected to. Herein, the term "friend" may refer to any other user of social-networking system 902 with whom a user has formed a connection, association, or relationship via social-networking system 902.

In particular embodiments, social-networking system 902 may provide users with the ability to take actions on various types of items or objects, supported by social-networking system 902. As an example and not by way of limitation, the items and objects may include groups or social networks to which users of social-networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 902 or by an external system of third-party system 908, which is separate from social-networking system 902 and coupled to social-networking system 902 via a network 904.

In particular embodiments, social-networking system 902 may be capable of linking a variety of entities. As an example and not by way of limitation, social-networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social-networking system 902. In particular embodiments, however, social-networking system 902 and third-party systems 908 may operate in conjunction with each other to provide social-networking services to users of social-networking system 902 or third-party systems 908. In this sense, social-networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 902 also includes user-generated content objects, which may enhance a user's interactions with social-networking system 902. User-generated content may include anything a user can add, upload, send, or "post" to social-networking system 902. As an example and not by way of limitation, a user communicates posts to social-networking system 902 from a client system 906. Posts may include data such as status updates or other textual data, location information, photos, videos, links, music or other similar data or media. Content may also be added to social-networking system 902 by a third-party through a "communication channel," such as a newsfeed or stream.

In particular embodiments, social-networking system 902 may include a variety of servers, sub-systems, programs, modules, logs, and data stores. In particular embodiments, social-networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 902 may also include suitable components such as network interfaces, security mechanisms, load balancers, failover servers, management-and-network-operations consoles, other suitable components, or any suitable combination thereof. In particular embodiments, social-networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 902 to one or more client systems 906 or one or more third-party system 908 via network 904. The web server may include a mail server or other messaging functionality for receiving and routing messages between social-networking system 902 and one or more client systems 906. An API-request server may allow a third-party system 908 to access information from social-networking system 902 by calling one or more APIs. An action logger may be used to receive communications from a web server about a user's actions on or off social-networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social-networking system 902. A privacy setting of a user determines how particular information associated with a user can be shared. The authorization server may allow users to opt in to or opt out of having their actions logged by social-networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
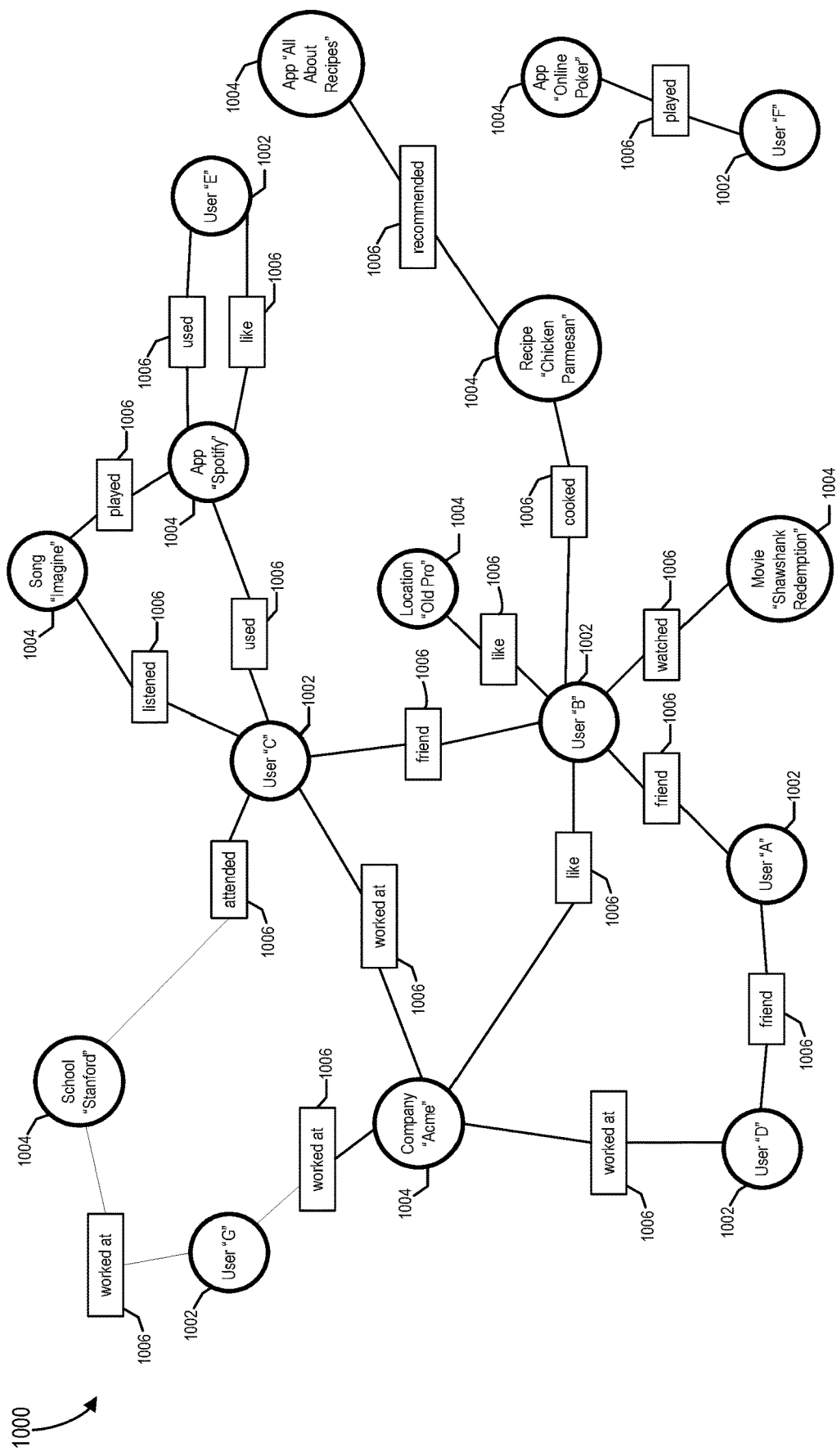
FIG. 10 illustrates an example social graph for a social-networking system in accordance with one or more embodiments.

FIG. 10 illustrates example social graph 1000. In particular embodiments, social-networking system 902 may store one or more social graphs 1000 in one or more data stores.

In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social-networking system 902. As an example and not by way of limitation, a user may be an individual (human user), an entity (e.g., an enterprise, business, or third-party application), or a group (e.g., of individuals or entities) that interacts or communicates with or over social-networking system 902. In particular embodiments, when a user registers for an account with social-networking system 902, social-networking system 902 may create a user node 1002 corresponding to the user, and store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with social-networking system 902. In particular embodiments, a user node 1002 may be associated with information provided by a user or information gathered by various systems, including social-networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social-networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social-networking system 902 a message indicating the user's action. In response to the message, social-networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 902 may send a "friend request" to the second user. If the second user confirms the "friend request," social-networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social-networking system 902 a message indicating the user's liking of the concept associated with the concept-profile page. In response to the message, social-networking system 902 may create an edge 1006 between user node 1002 associated with the user and concept node 1004, as illustrated by "like" edge 1006 between the user and concept node 1004. In particular embodiments, social-networking system 902 may store an edge 1006 in one or more data stores. In particular embodiments, an edge 1006 may be automatically formed by social-networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social-networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 902) or RSVP (e.g., through social-networking system 902) to an event associated with the advertisement. In addition, or as an alternative, an advertisement may include social-networking-system context directed to the user. As an example and not by way of limitation, an advertisement may display information about a friend of the user within social-networking system 902 who has taken an action associated with the subject matter of the advertisement.

In particular embodiments, social-networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 902 may calculate a coefficient based on a user's actions. Social-networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social-networking system 902 may analyze a user's actions to determine whether one or more of the actions indicate an affinity for subject matter, content, other users, and so forth. As an example and not by way of limitation, if a user may make frequently posts content related to "coffee" or variants thereof, social-networking system 902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 902 may calculate a coefficient based on the type of relationship between particular objects. Referencing the social graph 1000, social-networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 902 may determine that the user has a higher coefficient with respect to the first photo than the second photo because having a tagged-in-type relationship with content may be assigned a higher weight and/or rating than having a like-type relationship with content. In particular embodiments, social-networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social-networking system 902 may determine that the user has a higher coefficient for the airport than the gas station based on the proximity of the airport to the user.

In particular embodiments, social-networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 902 may provide information that is relevant to user's interests and current circumstances, increasing the likelihood that they will find such information of interest. In particular embodiments, social-networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social-networking system 902 may calculate the coefficient (or access the coefficient information if it has previously been calculated and stored). In particular embodiments, social-networking system 902 may measure an affinity with respect to a particular process. Different processes (both internal and external to the online social network) may request a coefficient for a particular object or set of objects. Social-networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/703,093, filed 11 Aug. 2006, U.S. patent application Ser. No. 12/979,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
  generating, by one or more servers of a commerce system, a messaging bot in response to an application program interface call from a merchant system associated with a merchant via an application program interface to implement the messaging bot at the commerce system, wherein the commerce system integrates with a plurality of merchant systems to generate a plurality of messaging bots in response to application program interface calls from the plurality of merchant systems via the application program interface to implement the plurality of messaging bots at the commerce system;
  detecting, by the one or more servers, a trigger indicating that a client device of a user is accessing content associated with products corresponding to the merchant within a merchant application or a merchant website corresponding to the merchant;
  accessing, by the one or more servers and within a user account associated with the user, a messaging history including a plurality of past messages from the user to the messaging bot at the commerce system, the plurality of past messages indicating a product available from the merchant;
  determining, by the one or more servers, a user interest in the product available from the merchant based on the messaging history;
  generating, by the one or more servers, a score for an offer associated with the product according to the user interest, the score indicating a level of the user interest in the product;
  initiating, by one or more servers in response to the trigger and based on the score for the offer meeting a threshold, a communications session between the user and the messaging bot associated with the merchant, the messaging bot comprising an artificial intelligence messaging service;
  providing, by the one or more servers to the client device of the user, a message comprising an offer from the messaging bot to the user to purchase the product within a messaging user interface for the communications session between the user and the messaging bot;
  receiving, by the one or more servers, one or more messages entered by the user into the messaging user interface for the communications session between the user and the messaging bot;
  analyzing, by the one or more servers using natural language processing, the one or more messages to identify the product and a request to complete a transaction between the user and the merchant for the product;
  initiating, by the one or more servers, a payment transaction between the user and the merchant for the product on behalf of the user based on analyzing the one or more messages using natural language processing; and
  providing, within the communications session, a payment initiation message from the messaging bot to the user indicating that the payment transaction was initiated.

2. The method as recited in claim 1, wherein analyzing the one or more messages to identify the product comprises identifying, using natural language processing, a description of the product in the one or more messages entered by the user into the messaging user interface.

3. The method as recited in claim 2, wherein analyzing the one or more messages to identify the product comprises:
  analyzing the message comprising the offer to determine a context of the communications session; and
  identifying the product based on the description of the product in the one or more messages entered by the user and the context of the communications session based on the message comprising the offer.

4. The method as recited in claim 1, wherein accessing the messaging history comprises:
  analyzing the plurality of past messages to determine that the user has expressed a like for a characteristic in a past message of the plurality of past messages; and determining the user interest in the product based on the product comprising the characteristic.

5. The method as recited in claim 1, wherein providing the payment initiation message from the messaging bot to the user comprises entering the payment initiation message in a messaging thread according to a chronological order of messages between the user and the messaging bot.

6. The method as recited in claim 1, wherein initiating the payment transaction comprises:
   providing, to the merchant in response to identifying the product and the request, a request to initiate the payment transaction between the user and the merchant; and
   receiving, from the merchant, a response indicating that the payment transaction was initiated.

7. The method as recited in claim 6, wherein providing the request to initiate the payment transaction comprises providing, to the merchant, payment information and a product identifier for completing the payment transaction.

8. The method as recited in claim 1, wherein initiating the payment transaction comprises:
   accessing, in response to identifying a name of a payment method in the one or more messages, the user account associated with the user to obtain a payment token corresponding to the payment method for processing the transaction; and
   initiating the payment transaction using the payment token corresponding to the payment method.

9. The method as recited in claim 1, further comprising initiating and completing the payment transaction between the user and the merchant within a messaging flow of the communications session and without redirecting a client device of the user away from the messaging user interface to complete the payment transaction.

10. A system comprising:
    at least one processor; and
    a non-transitory computer readable storage medium comprising instructions that, when executed by the at least one processor, cause the system to:
        generate, by a commerce system, a messaging bot merchanting response to an application program interface call from a merchant system associated with a merchant via an application program interface to implement the messaging bot at the commerce system, wherein the commerce system integrates with a plurality of merchant systems to generate a plurality of messaging bots in response to application program interface calls from the plurality of merchant systems via the application program interface to implement the plurality of messaging bots at the commerce system;
        detect a trigger indicating that a client device of a user is accessing content associated with products corresponding to the merchant within a merchant application or a merchant website corresponding to the merchant;
        access, within a user account associated with the user, a messaging history including a plurality of past messages from the user to the messaging bot at the commerce system, the plurality of messages indicating a product available from the merchant;
        determine a user interest in the product available from the merchant based on the messaging history;
        generate a score for an offer associated with the product according to the user interest, the score indicating a level of the user interest in the product;
        initiate, in response to the trigger and based on the score for the offer meeting a threshold, a communications session between the user and the messaging bot associated with the merchant, the messaging bot comprising an artificial intelligence messaging service;
        provide, to the client device of the user, a message comprising an offer from the messaging bot to the user to purchase the product within a messaging user interface for the communications session between the user and the messaging bot;
        receive one or more messages entered by the user into the messaging user interface for the communications session between the user and the messaging bot;
        analyze, using natural language processing, the one or more messages to identify the product and a request to complete a transaction between the user and the merchant for the product;
        initiate a payment transaction between the user and the merchant for the product on behalf of the user based on analyzing the one or more messages using natural language processing; and
        provide, within the communications session, a payment initiation message from the messaging bot to the user indicating that the payment transaction was initiated.

11. The system as recited in claim 10, further comprising instructions that, when executed by the at least one processor, cause the system to analyze the one or more messages to:
    identify, using natural language processing, a description of the product in the one or more messages entered by the user into the messaging user interface; and
    select, based on the identified description of the product, the product from a product database associated with the merchant.

12. The system as recited in claim 11, further comprising instructions that, when executed by the at least one processor, cause the system to:
    identify, based on the identified description of the product, a plurality of possible products from the product database; and
    provide, in connection with the communications session, a message from the messaging bot to request additional identifying information from the user for identifying the product.

13. The system as recited in claim 10, wherein the instructions that cause the system to analyze the one or more messages to identify the product cause the system to:
    analyze the message comprising the offer to determine a context of the communications session; and
    identify the product based on the context of the communications session based on the message comprising the offer.

14. The system as recited in claim 10, further comprising instructions that, when executed by the at least one processor, cause the system to initiate the payment transaction comprising:
    providing, to the merchant in response to identifying the product and the request, a request to initiate the payment transaction between the user and the merchant; and
    receiving, from the merchant, a response indicating that the payment transaction was initiated.

15. The system as recited in claim 14, further comprising instructions that, when executed by the at least one processor, cause the system to provide the request to initiate the payment transaction by providing, to the merchant, a payment token for a payment credential of the user and a product identifier for completing the payment transaction.

16. The system as recited in claim 10, further comprising instructions that, when executed by the at least one processor, cause the system to:
- receive payment information associated with the payment transaction from the merchant; and
- process, using the payment information, the payment transaction with a payment network associated with the payment transaction on behalf of the merchant.

17. The system as recited in claim 10, further comprising instructions that, when executed by the at least one processor, cause the system to determine that a user preference associated with the user account includes permission for the messaging bot to initiate communications with the user prior to initiating the communications session between the user and the messaging bot.

18. A non-transitory computer readable storage medium comprising instructions that, when executed by at least one processor, cause a computer system to:
- generate, by a commerce system, a messaging bot in response to an application program interface call from a merchant system associated with a merchant via an application program interface to implement the messaging bot at the commerce system, wherein the commerce system integrates with a plurality of merchant systems to generate a plurality of messaging bots in response to application program interface calls from the plurality of merchant systems via the application program interface to implement the plurality of messaging bots at the commerce system;
- detect a trigger indicating that a client device of a user is accessing content associated with products corresponding to the merchant within a merchant application or a merchant website corresponding to the merchant;
- access, within a user account associated with the user, a messaging history including a plurality of past messages from the user to the messaging bot at the commerce system, the plurality of messages indicating a product available from the merchant;
- determine a user interest in the product available from the merchant based on the messaging history;
- generate a score for an offer associated with the product according to the user interest, the score indicating a level of the user interest in the product;
- initiate, in response to the trigger and based on the score for the offer meeting a threshold, a communications session between the user and the messaging bot associated with the merchant, the messaging bot comprising an artificial intelligence messaging service;
- receive one or more messages entered by the user into the messaging user interface for the communications session between the user and the messaging bot;
- provide, to the client device of the user, a message comprising an offer from the messaging bot to the user to purchase the product within a messaging user interface for the communications session between the user and the messaging bot;
- analyze, using natural language processing, the one or more messages to identify the product and a request to complete a transaction between the user and the merchant for the product;
- initiate a payment transaction between the user and the merchant for the product on behalf of the user based on analyzing the one or more messages using natural language processing; and
- provide, within the communications session, a payment initiation message from the messaging bot to the user indicating that the payment transaction was initiated.

19. The non-transitory computer readable storage medium as recited in claim 18, wherein the instructions that cause the computer system to analyze the one or more messages cause the computer system to:
- analyze the plurality of past messages to determine that the user has expressed a like for a characteristic in a past message of the plurality of past messages; and
- determining the user interest in the product based on the product comprising the characteristic.

20. The non-transitory computer readable storage medium as recited in claim 18, wherein the instructions that cause the computer system to analyze the one or more messages cause the computer system to:
- analyze the message comprising the offer to determine a context of the communications session; and
- identify the product based on the description of the product in the one or more messages entered by the user and the context of the communications session based on the message comprising the offer.

* * * * *